(12) United States Patent
Nam et al.

(10) Patent No.: US 8,913,682 B2
(45) Date of Patent: Dec. 16, 2014

(54) APPARATUS AND METHOD FOR CHANNEL STATE INFORMATION CODEWORD CONSTRUCTION FOR A CELLULAR WIRELESS COMMUNICATION SYSTEM

(71) Applicant: Samsung Electronics Co., Ltd, Suwon-si, Gyeonggi-do (KR)

(72) Inventors: Young-Han Nam, Richardson, TX (US); Krishna Sayana, San Jose, CA (US); Jinkyu Han, Allen, TX (US); Boon Loong Ng, Dallas, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 27 days.

(21) Appl. No.: 13/896,540

(22) Filed: May 17, 2013

(65) Prior Publication Data
US 2013/0308715 A1  Nov. 21, 2013

Related U.S. Application Data

(60) Provisional application No. 61/649,022, filed on May 18, 2012, provisional application No. 61/666,563, filed on Jun. 29, 2012.

(51) Int. Cl.
  *H04B 7/02* (2006.01)
  *H04B 7/04* (2006.01)
  *H04B 7/06* (2006.01)

(52) U.S. Cl.
  CPC ............ *H04B 7/0478* (2013.01); *H04B 7/0469* (2013.01); *H04B 7/0639* (2013.01); *H04B 7/0634* (2013.01); *H04B 7/0626* (2013.01); *H04B 7/063* (2013.01)
  USPC ......................................................... 375/267

(58) Field of Classification Search
  USPC ......... 375/260, 267, 285, 316, 340, 346–348; 370/328, 332, 334
  See application file for complete search history.

(56) References Cited

U.S. PATENT DOCUMENTS

| 2011/0274188 A1 | 11/2011 | Sayana et al. |
| 2012/0003945 A1 | 1/2012 | Liu et al. |

(Continued)

FOREIGN PATENT DOCUMENTS

| KR | 20100013263 A | 2/2010 |
| KR | 20110114482 A | 10/2011 |

OTHER PUBLICATIONS

International Search Report dated Sep. 26, 2013 in connection with International Patent Application No. PCT/KR2013/004413, 4 pages.

(Continued)

*Primary Examiner* — Khanh C Tran

(57) ABSTRACT

A mobile station configured to receive transmissions from a two-dimensional array of antennas at a base station is provided. A main processor of the mobile station is configured to estimate first and second channel states and determine a co-phasing scalar component for each of multiple groups of antennas in the array based on the first channel state. The main processor is configured to generate a matrix X that includes a plurality of column vectors selected from a codebook based on the second channel state, generate a matrix $P_1$, wherein the matrix $P_1$ is a block diagonal matrix having the matrix X for each block diagonal element, and generate a matrix $P_2$. The main processor is also configured to transmit to the base station information corresponding to the matrix $P_1$ and to the matrix $P_2$, as well as a CQI that is derived with a precoding matrix P defined by $P=P_1 P_2$.

18 Claims, 13 Drawing Sheets

(56) References Cited

U.S. PATENT DOCUMENTS

| | | | |
|---|---|---|---|
| 2012/0236736 A1* | 9/2012 | Frank et al. | 370/252 |
| 2013/0107849 A1* | 5/2013 | Park | 370/329 |
| 2013/0286949 A1* | 10/2013 | Tomeba et al. | 370/328 |
| 2014/0177683 A1* | 6/2014 | Krishnamurthy et al. | 375/219 |
| 2014/0177745 A1* | 6/2014 | Krishnamurthy et al. | 375/267 |

OTHER PUBLICATIONS

Written Opinion of International Searching Authority dated Sep. 26, 2013 in connection with International Patent Application No. PCT/KR2013/004413, 5 pages.

European Search Report dated Aug. 16, 2013 in connection with European Patent Application No. 13168503.4, 7 pages.

3GPP TSG RAN WG1#60bis; "Further results of DL 8TX codebook"; Huawei; Beijing, China; Apr. 12-16, 2010; 11 pages.

3GPP TSG-RAN WG1 #66; "Considerations on CSI feedback enhancements for high-priority antenna configurations"; Alcatel-Lucent Shanghai Bell; Athens, Greece; Aug. 22-26, 2011; 7 pages.

3GPP TSG-RAN WG1 Meeting #67; "Single point CSI feedback for enhanced DL MIMO"; Renesas Mobile Europe Ltd.; San Francisco, USA; Nov. 14-18, 2011; 6 pages.

* cited by examiner

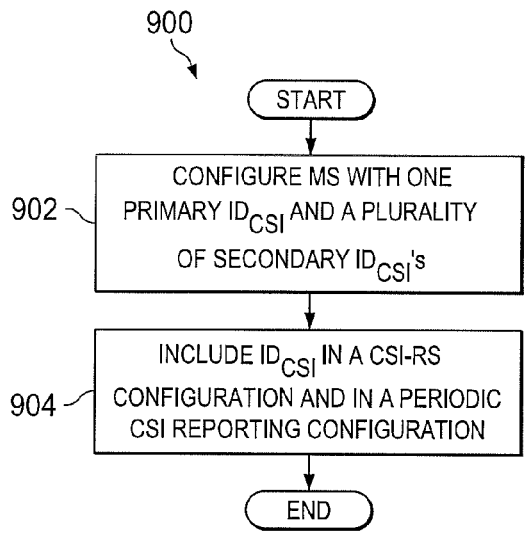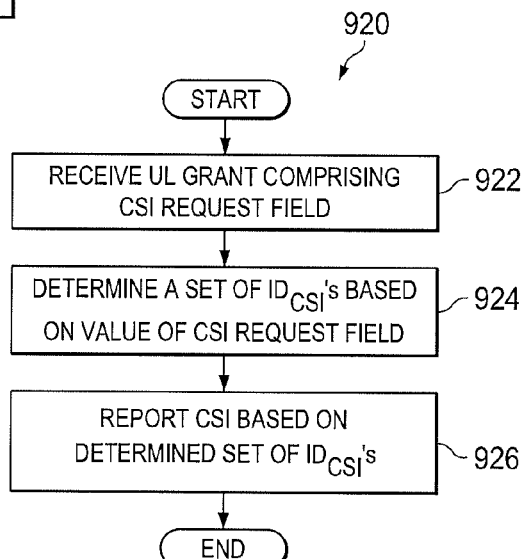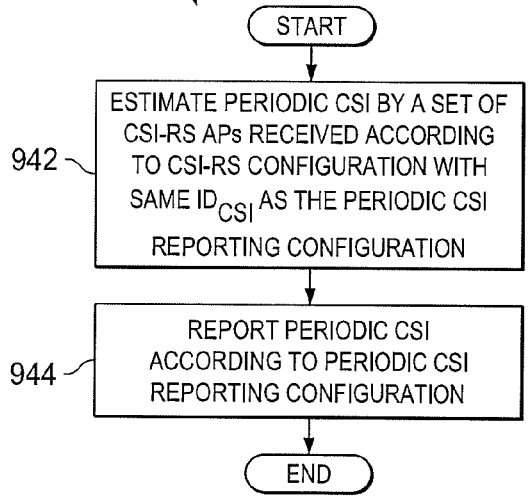

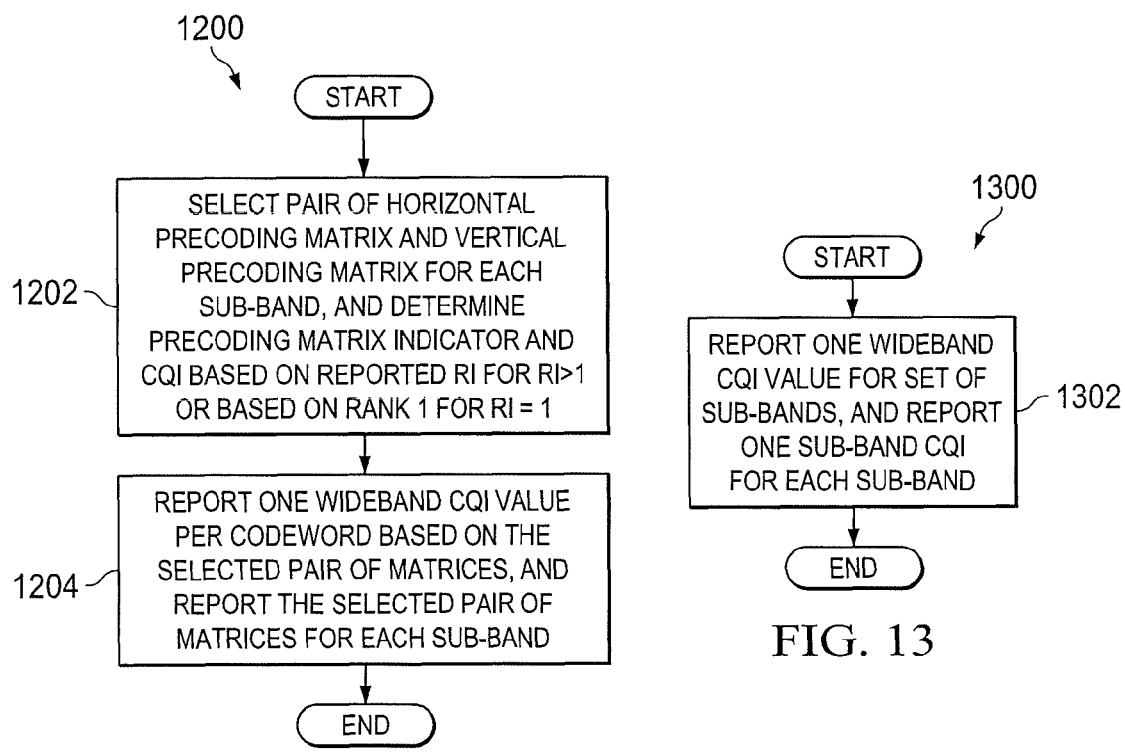
FIG. 12
FIG. 13
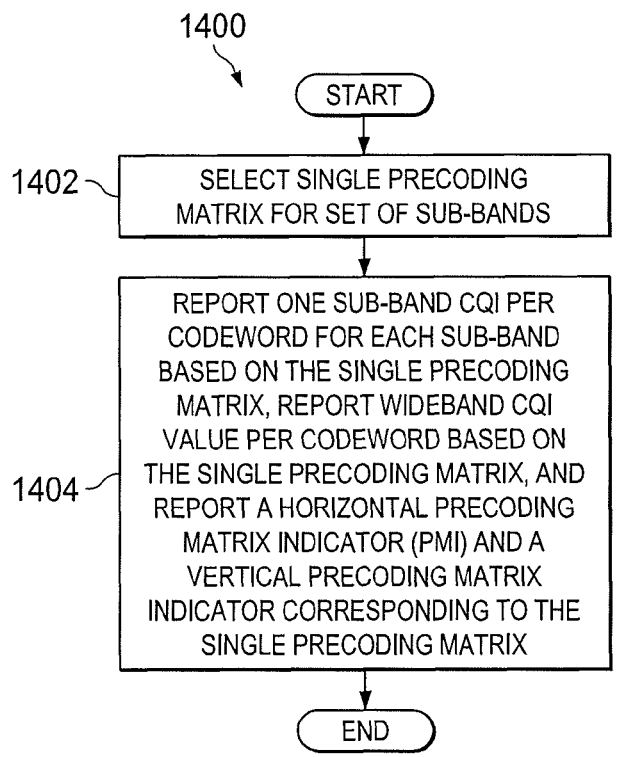
FIG. 14

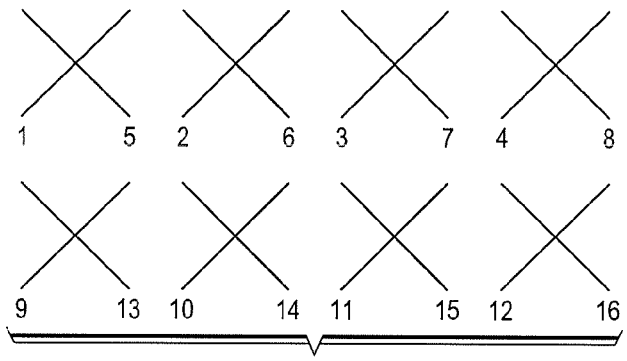
FIG. 17B
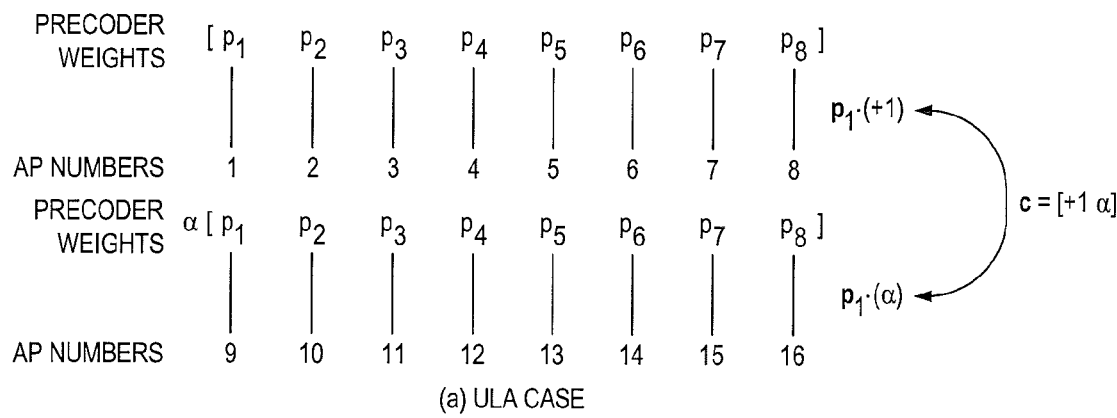
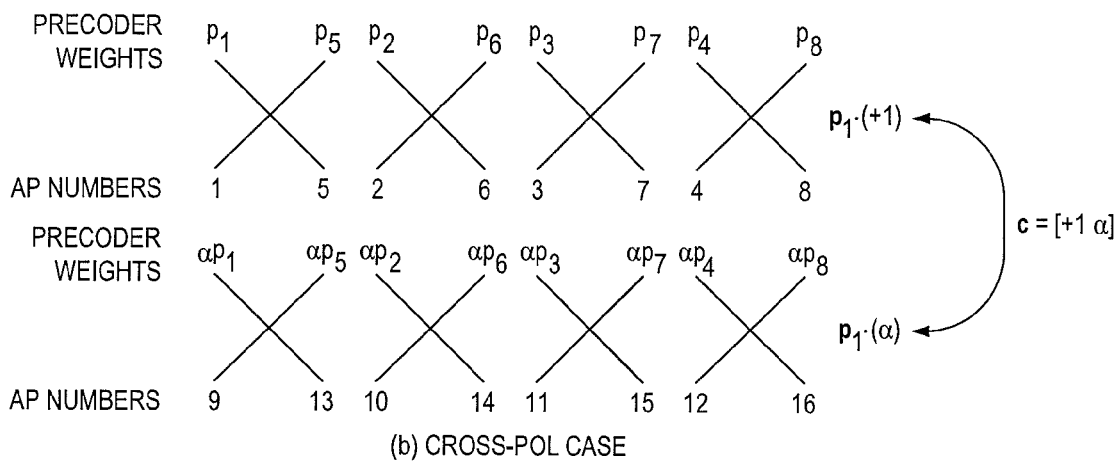
FIG. 18

APPARATUS AND METHOD FOR CHANNEL STATE INFORMATION CODEWORD CONSTRUCTION FOR A CELLULAR WIRELESS COMMUNICATION SYSTEM

CROSS-REFERENCE TO RELATED APPLICATION(S) AND CLAIM OF PRIORITY

The present application claims priority to U.S. Provisional Patent Application No. 61/649,022, filed May 18, 2012, titled "CHANNEL STATE INFORMATION REPORTING FOR CELLULAR WIRELESS COMMUNICATION SYSTEMS," and to U.S. Provisional Patent Application No. 61/666,563, filed Jun. 29, 2012, titled "ON CHANNEL STATE INFORMATION FEEDBACK FOR WIRELESS COMMUNICATION SYSTEMS." The content of the above-identified patent documents is incorporated herein by reference.

TECHNICAL FIELD

The present application relates generally to wireless communications and, more specifically, to an apparatus and method for channel state information codeword construction for a cellular wireless communication system.

BACKGROUND

Traditionally, a mobile station's feedback of channel state information (CSI) is designed mainly targeting horizontal CSI. For example, feedback of a precoding matrix indicator and channel quality information for downlink beamforming in long-term evolution (LTE) systems informs a corresponding base station of the horizontal direction along which the mobile station receives the strongest signal and the associated channel strength. However, when active antenna elements are introduced in the vertical domain as well, CSI reference signals have to be designed to include vertical CSI feedback along with horizontal CSI feedback.

SUMMARY

This disclosure provides an apparatus and method for channel state information (CSI) codeword construction for a cellular wireless communication system.

In one embodiment, a mobile station is provided. The mobile station is configured to receive transmissions from a two-dimensional array of antennas at a base station. The array comprises a plurality of groups of antennas. The mobile station includes a main processor configured to receive from the base station a first configuration for a first set of reference signals and a second configuration for a second set of reference signals. The main processor is also configured to estimate a first channel state with the first set of reference signals and a second channel state with the second set of reference signals and to determine a co-phasing scalar component for each of the groups of antennas based on the first channel state. The main processor is also configured to generate a matrix X comprising a plurality of column vectors selected from a codebook based on the second channel state. Each of the column vectors quantizes channel coefficients for one of the groups of antennas. The main processor is also configured to generate a matrix $P_1$. The matrix $P_1$ is a block diagonal matrix having the matrix X for each block diagonal element. The main processor is also configured to generate a matrix $P_2$ that includes a plurality of vector elements. Each vector element includes one of the co-phasing scalar components and a column selector vector configured to select a column of the matrix X. The main processor is also configured to transmit to the base station a first precoding matrix information corresponding to the matrix $P_1$ and a second precoding matrix information corresponding to the matrix $P_2$. The main processor is also configured to transmit to the base station a channel quality information (CQI). The CQI is derived with a precoding matrix P defined by $P=P_1P_2$.

In another embodiment, a method for constructing a CSI codeword at a mobile station in a wireless communication system that includes a base station having a two-dimensional array of antennas is provided. The array includes a plurality of groups of antennas. The method includes receiving from the base station a first configuration for a first set of reference signals and a second configuration for a second set of reference signals. A first channel state is estimated with the first set of reference signals and a second channel state is estimated with the second set of reference signals. A co-phasing scalar component is determined for each of the groups of antennas based on the first channel state. A matrix X is generated that includes a plurality of column vectors selected from a codebook based on the second channel state. Each of the column vectors quantizes channel coefficients for one of the groups of antennas. A matrix $P_1$ is generated, where the matrix $P_1$ is a block diagonal matrix having the matrix X for each block diagonal element. A matrix $P_2$ is generated that includes a plurality of vector elements. Each vector element includes one of the co-phasing scalar components and a column selector vector configured to select a column of the matrix X. A first precoding matrix information corresponding to the matrix $P_1$ and a second precoding matrix information corresponding to the matrix $P_2$ are transmitted to the base station. A CQI is transmitted to the base station. The CQI is derived with a precoding matrix P defined by $P=P_1P_2$.

In yet another embodiment, a base station in a wireless communication system is provided that includes a two-dimensional array of antennas and a base transceiver subsystem (BTS) controller. The array includes a plurality of groups of antennas. The BTS controller is configured to transmit to a mobile station a first configuration for a first set of reference signals and a second configuration for a second set of reference signals. The BTS controller is also configured to receive from the mobile station a first precoding matrix information corresponding to a matrix $P_1$ and a second precoding matrix information corresponding to a matrix $P_2$. A first channel state is estimated with the first set of reference signals and a second channel state is estimated with the second set of reference signals. A co-phasing scalar component is determined for each of the groups of antennas based on the first channel state. The matrix $P_1$ is a block diagonal matrix having a matrix X for each block diagonal element. The matrix $P_2$ includes a plurality of vector elements. Each vector element includes one of the co-phasing scalar components and a column selector vector configured to select a column of the matrix X. The matrix X includes a plurality of column vectors selected from a codebook based on the second channel state. Each of the column vectors quantizes channel coefficients for one of the groups of antennas. The BTS controller is also configured to receive from the mobile station a CQI. The CQI is derived with a precoding matrix P defined by $P=P_1P_2$.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9A illustrates a method for configuring a mobile station for channel state information reporting according to an embodiment of the disclosure;

FIG. 9B illustrates a method for aperiodic channel state information reporting for a mobile station configured according to the method of FIG. 9A according to an embodiment of the disclosure;

FIG. 9C illustrates a method for periodic channel state information reporting for a mobile station configured according to the method of FIG. 9A according to an embodiment of the disclosure;

FIG. 12 illustrates a method for providing wideband feedback from a mobile station according to yet another embodiment of the disclosure;

FIG. 13 illustrates a method for providing higher-layer configured sub-band feedback from a mobile station according to an embodiment of the disclosure;

FIG. 14 illustrates a method for providing higher-layer configured sub-band feedback from a mobile station according to another embodiment of the disclosure;

FIG. 17B illustrates 2D cross-polarized array antennas according to an embodiment of the disclosure; and FIG. 18 illustrates an example of the construction of a precoder codeword for a 2D array antenna system according to an embodiment of the disclosure.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
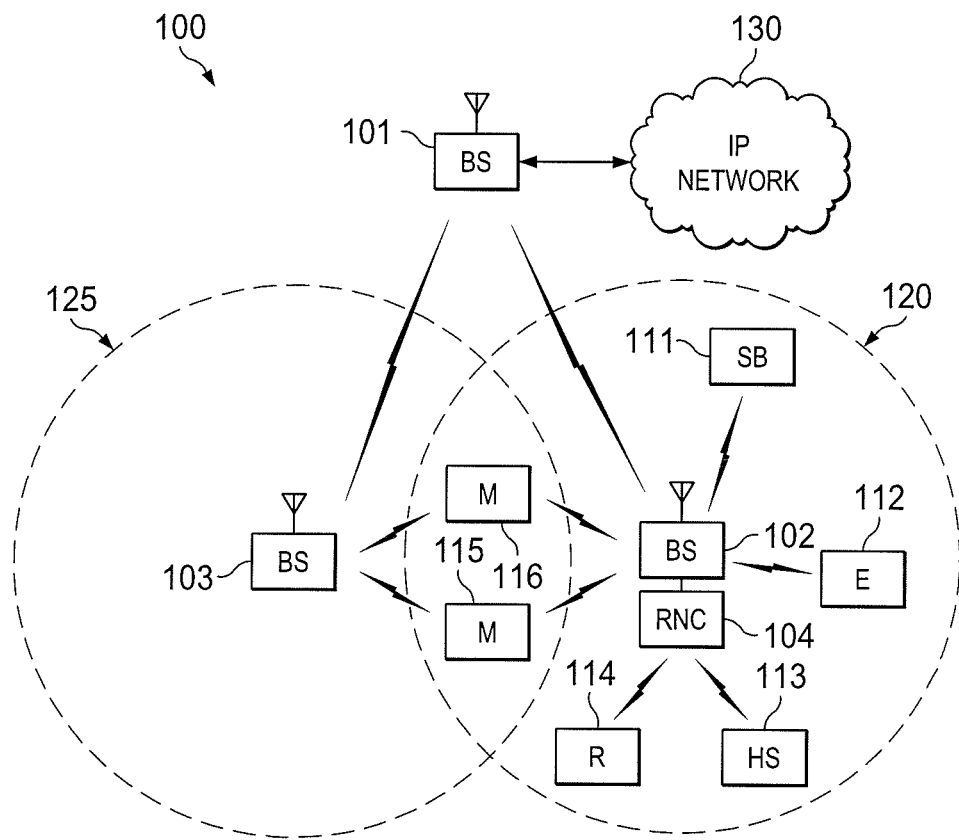
FIG. 1 illustrates a wireless network according to an embodiment of the disclosure.

FIG. 1 illustrates an example of a wireless network 100 according to one embodiment of the present disclosure. In the illustrated embodiment, the wireless network 100 includes base station (BS) 101, base station 102, and base station 103. Base station 101 communicates with base station 102 and base station 103. Base station 101 also communicates with Internet protocol (IP) network 130, such as the Internet, a proprietary IP network, or other data network. Base station 102 communicates with a Radio Network Controller (RNC) 104. In certain embodiments, the RNC 104 may be a part of base station 102. In certain embodiments, base station 101 and base station 103 may also communicate with the RNC 104. In other embodiments, base station 101 and base station 103 may include, or be in communication with, another radio network controller similar to the RNC 104. Base station 102 or base station 103 may communicate with IP network 130 using wireline, instead of communicating with base station 101 wirelessly.

Base station 102, either in cooperation with the RNC 104 or through the RNC 104, provides wireless broadband access to the network 130 to a first plurality of subscriber stations within a coverage area 120 of base station 102. The first plurality of subscriber stations includes subscriber station (SS) 111, subscriber station 112, subscriber station 113, subscriber station 114, subscriber station 115 and subscriber station 116. Subscriber stations 111-116 may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, and SS 115 and SS 116 may be mobile devices.

Base station 103 provides wireless broadband access to the network 130, via base station 101, to a second plurality of subscriber stations within a coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that the wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

Although FIG. 1 depicts one example of a wireless network 100, various changes may be made to FIG. 1. For example, another type of data network, such as a wired network, may be substituted for the wireless network 100. In a wired network, network terminals may replace BS's 101-103 and SS's 111-116. Wired connections may replace the wireless connections depicted in FIG. 1.

Figure 2A:
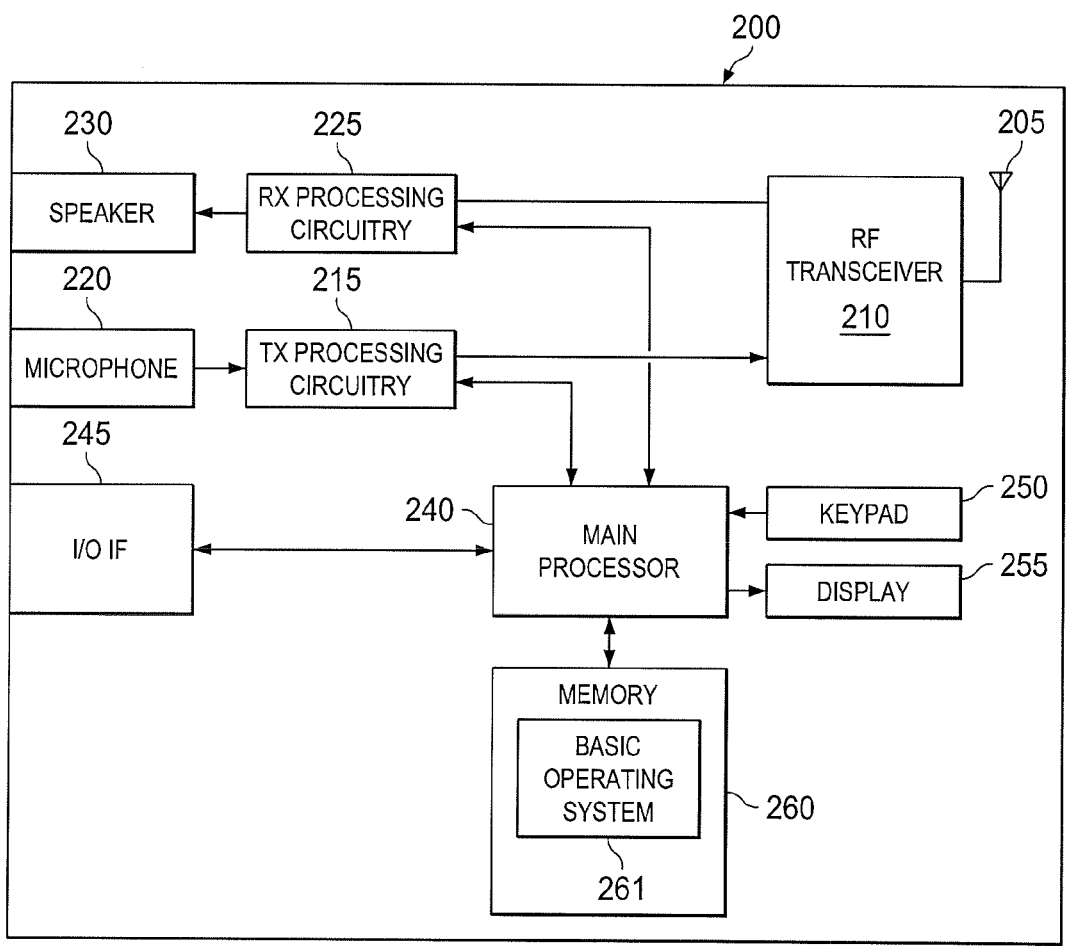
FIG. 2A illustrates a wireless mobile station according to an embodiment of the disclosure.

FIG. 2A illustrates a wireless mobile station 200 according to embodiments of the present disclosure. In certain embodiments, the wireless mobile station 200 may represent any of the subscriber stations 111-116 shown in FIG. 1. The embodiment of the wireless mobile station 200 illustrated in FIG. 2A is for illustration only. Other embodiments of the wireless mobile station 200 could be used without departing from the scope of this disclosure.

The wireless mobile station 200 comprises an antenna 205, a radio frequency (RF) transceiver 210, transmit (TX) processing circuitry 215, a microphone 220, receive (RX) processing circuitry 225 and a speaker 230. The mobile station 200 also comprises a main processor 240, an input/output (I/O) interface (IF) 245, a keypad 250, a display 255 and a memory 260.

The RF transceiver 210 receives from the antenna 205 an incoming RF signal transmitted by a base station of the wireless network 100. The RF transceiver 210 down-converts the incoming RF signal to produce an intermediate frequency (IF) or a baseband signal. The IF or baseband signal is sent to the RX processing circuitry 225 that produces a processed baseband signal by filtering, decoding and/or digitizing the baseband or IF signal. The RX processing circuitry 225 transmits the processed baseband signal to the speaker 230 (i.e., voice data) or to the main processor 240 for further processing (e.g., web browsing).

The TX processing circuitry 215 receives analog or digital voice data from the microphone 220 or other outgoing baseband data (e.g., web data, e-mail, interactive video game data) from the main processor 240. The TX processing circuitry 215 encodes, multiplexes and/or digitizes the outgoing baseband data to produce a processed baseband or IF signal. The RF transceiver 210 receives the outgoing processed baseband or IF signal from the TX processing circuitry 215. The RF transceiver 210 up-converts the baseband or IF signal to a RF signal that is transmitted via the antenna 205.

In some embodiments of the present disclosure, the main processor 240 is a microprocessor or microcontroller. The memory 260 is coupled to the main processor 240. The memory 260 can be any computer-readable medium. For example, the memory 260 can be any electronic, magnetic, electromagnetic, optical, electro-optical, electro-mechanical and/or other physical device that can contain, store, communicate, propagate, or transmit a computer program, software, firmware, or data for use by the microprocessor or other computer-related system or method. According to such embodiments, part of the memory 260 comprises a random access memory (RAM) and another part of the memory 260 comprises a Flash memory, which acts as a read-only memory (ROM).

The main processor 240 executes a basic operating system program 261 stored in the memory 260 in order to control the overall operation of the mobile station 200. In one such operation, the main processor 240 controls the reception of forward channel signals and the transmission of reverse channel signals by the RF transceiver 210, the RX processing circuitry 225, and the TX processing circuitry 215, in accordance with well-known principles.

The main processor 240 is capable of executing other processes and programs resident in the memory 260. The main processor 240 can move data into or out of the memory 260, as required by an executing process. The main processor 240 is also coupled to the I/O interface 245. The I/O interface 245 provides the mobile station 200 with the ability to connect to other devices such as laptop computers and handheld computers. The I/O interface 245 is the communication path between these accessories and the main controller 240.

The main processor 240 is also coupled to the keypad 250 and the display unit 255. The operator of the mobile station 200 uses the keypad 250 to enter data into the mobile station 200. The display 255 may be a liquid crystal or light emitting diode (LED) display capable of rendering text and/or graphics from web sites. Alternate embodiments may use other types of displays. For example, for an embodiment in which the display 255 is a touch-screen display, the keypad 250 may be provided via the display 255.

For some embodiments, as described in more detail below, the mobile station 200 may be configured to receive multiple channel state information-reference signal (CSI-RS) configurations that may also be stored in the memory 260, where each configuration instructs the main processor 240 to estimate CSI and/or long-term channel statistics, such as RSRP/RSRQ, using the configured set of CSI-RS APs through a CSI estimation process stored in the memory 260.

The mobile station 200 may also be configured to receive multiple periodic CSI reporting configurations for a cell. In this case, the main processor 240 may be notified which set of CSI-RS APs to use for estimating channels for the periodic CSI reporting. In addition, the main processor 240 may select a subset of CSI out of all those CSIs estimated by the multiple sets of the configured CSI-RS APs for aperiodic CSI reporting.

The mobile station 200 may also be configured to construct a precoder codeword P that can be used for $N_T$-Tx antenna transmission, where $P=P_1P_2$ and where $P_1$ is a matrix and $P_2$ is a vector or vice versa, as described in more detail below in connection with FIGS. 15-18.

Although FIG. 2A depicts one example of a mobile station 200, various changes may be made to FIG. 2A. For example, a wired or wireless network terminal may be substituted for the mobile device 200. A wired network terminal may or may not include components for wireless communication, such as an antenna.

Figure 2B:
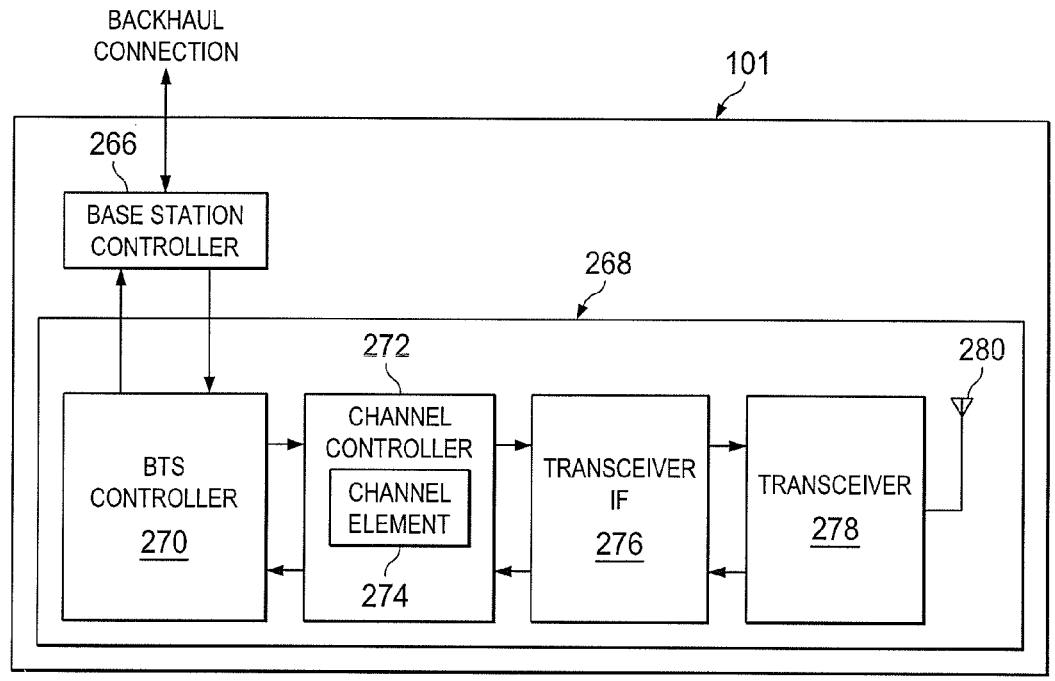
FIG. 2B illustrates a base station according to an embodiment of the disclosure.

FIG. 2B illustrates a base station 101 according to an embodiment of the disclosure. The same or similar structure could be used in the base stations 102-103 of FIG. 1. As shown in FIG. 2B, the base station 101 includes a base station controller (BSC) 266 and one or more base transceiver subsystems (BTSs) 268. The BSC 266 manages the resources of the base station 101, including the BTSs 268. Each BTS 268 includes a BTS controller 270, a channel controller 272, a transceiver interface (IF) 276, an RF transceiver 278, and an antenna array 280. The channel controller 272 includes a plurality of channel elements 274.

The BTS controller 270 includes processing circuitry and memory capable of executing an operating program that communicates with the BSC 266 and controls the overall operation of the BTS 268. Under normal conditions, the BTS controller 270 directs the operation of the channel controller 272, where the channel elements 274 perform bi-directional communications in forward channels and reverse channels. The transceiver IF 276 transfers bi-directional channel signals between the channel controller 272 and the RF transceiver 278. The RF transceiver 278 (which could represent integrated or separate transmitter and receiver units) transmits and receives wireless signals via the antenna array 280. The antenna array 280 transmits forward channel signals from the RF transceiver 278 to mobile stations in the coverage area of the base station 101. The antenna array 280 also sends to the transceiver 278 reverse channel signals received from the mobile stations in the coverage area of the base station 101.

As described below, for some embodiments, the base station 101 may be configured to transmit multiple CSI-RS configurations to mobile stations in the coverage area of the base station 101. Each configuration instructs a mobile station to estimate CSI and/or long-term channel statistics, such as RSRP/RSRQ, using the configured set of CSI-RS APs through a CSI estimation process.

The base station 101 may also be configured to transmit multiple periodic CSI reporting configurations for a cell to the mobile stations. In this case, the base station 101 may notify each mobile station which set of CSI-RS APs to use for estimating channels for the periodic CSI reporting. The base station 101 may also be configured to construct a precoder codeword P that can be used for $N_T$-Tx antenna transmission, where $P=P_1P_2$ and where $P_1$ is a matrix and $P_2$ is a vector or vice versa, as described in more detail below in connection with FIGS. 15-18.

Although FIG. 2B illustrates one example of a base station 101, various changes may be made to FIG. 2B. For example, various components in FIG. 2B could be combined, further subdivided, or omitted and additional components could be added according to particular needs.

Figure 3:
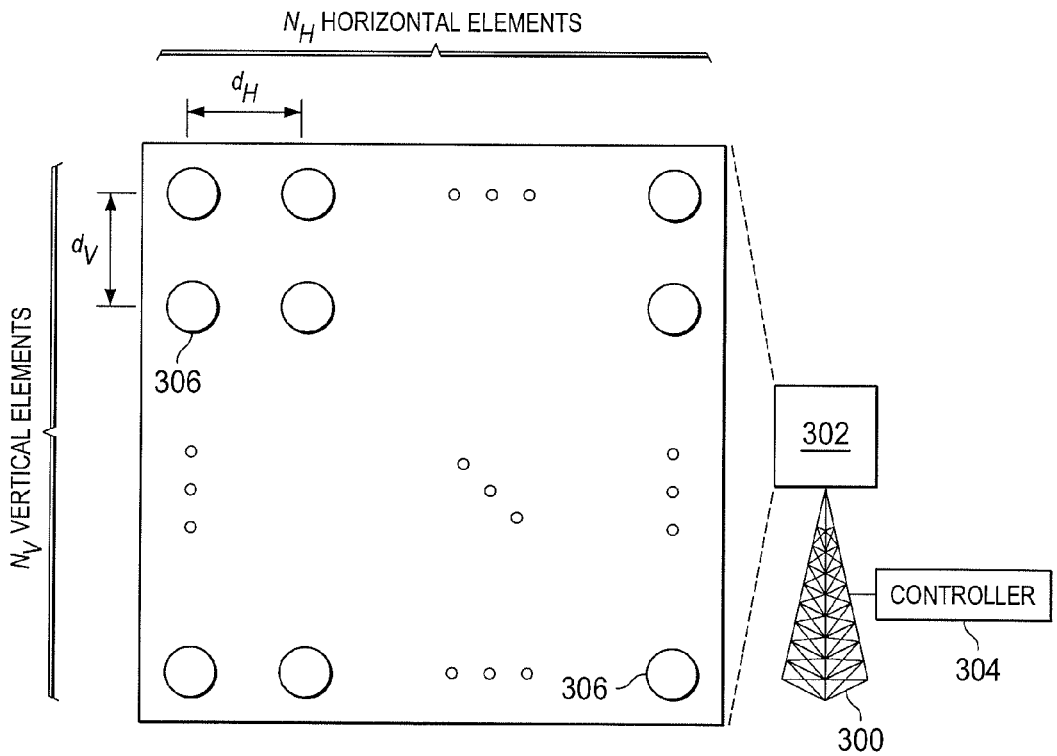
FIG. 3 illustrates a transmission point equipped with two-dimensional active antenna array according to an embodiment of the disclosure.

FIG. 3 illustrates a transmission point 300 equipped with a two-dimensional active antenna array 302 according to an embodiment of the disclosure. The embodiment of the transmission point 300 shown in FIG. 3 is for illustration only. Other embodiments of the transmission point 300 could be used without departing from the scope of this disclosure.

The transmission point 300 is a network node configured to transmit downlink signals and receive uplink signals in a wireless communication network. For example, the transmission point 300 may comprise a base station, a NodeB, an enhanced NodeB (eNB), a remote radio head (RRH) or the like. The transmission point 300 is coupled to a controller 304, which is configured to control at least one transmission point. The controller 304 may comprise the network, an eNB or other suitable type of controller. The active antenna array 302 may have its own base band, separate from base bands of other active antenna arrays in the network, which could dynamically control the antenna weights in a frequency-selective manner.

The transmission point 300 has N 2D active antenna elements 306, where $N=N_H \times N_V$. The N antenna elements 306 are placed in a 2D grid of $N_H \times N$. The horizontal spacing between any two closest antenna elements 306 is denoted by $d_H$, and the vertical spacing between any two closest antenna elements 306 is denoted by $d_V$.

Although FIG. 3 illustrates one example of a transmission point 300, various changes may be made to FIG. 3. For example, the makeup and arrangement of the transmission point 300 and its array 302 are for illustration only. Components could be added, omitted, combined, subdivided, or placed in any other suitable configuration according to particular needs.

Figure 4:
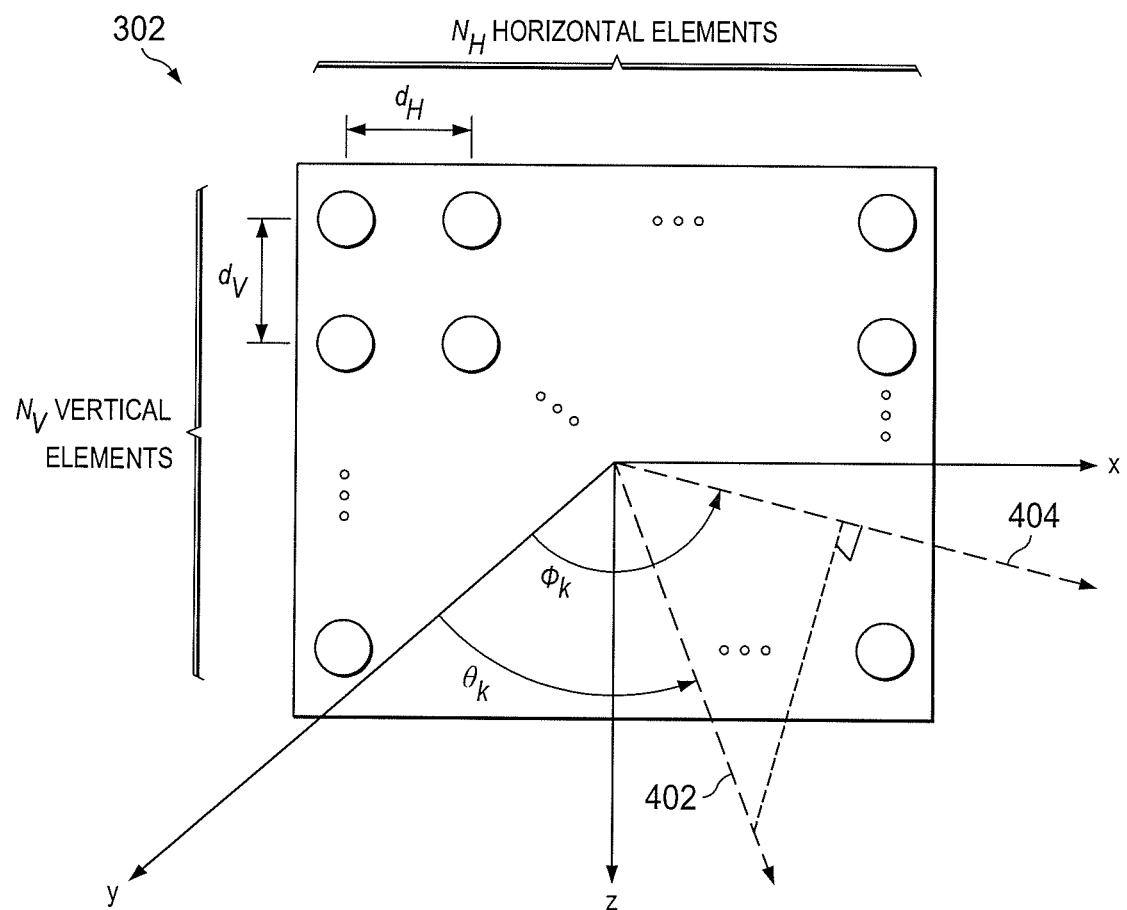
FIG. 4 illustrates azimuth and elevation angles for the active antenna array of FIG. 3 according to an embodiment of the disclosure.

FIG. 4 illustrates azimuth and elevation angles for the active antenna array 302 according to an embodiment of the disclosure. The azimuth and elevation angles correspond to angles for transmissions from the transmission point 300 to a mobile station. For the illustrated example, a line 402 indicates the direction to a $k^{th}$ mobile station (MS k), and a line 404 indicates the projection of the line 402 onto the XY plane. For this example, the azimuth angle to MS k from the transmission point 300 is shown as $\phi_k$, and the elevation angle to MS k from the transmission point 300 is shown as $\theta_k$. In the illustrated example, antenna elements 306 are placed in a rectangle on the XZ plane in an orthogonal XYZ coordinate system. The origin of the coordinate system is placed at the center of the rectangle. The azimuth (horizontal) angle $\theta_k$ for MS k is defined as the angle between the Y-axis and the projection vector of a straight line between the transmission point 300 and the MS k to the XY plane. On the other hand, the elevation (vertical) angle $\phi_k$ is defined as the angle between the Y-axis and the projection vector of the straight line to the YZ plane.

In a cellular network, the network utilizes CSI of the mobile stations to schedule time-frequency resources, to select precoders, and to select modulation and coding schemes (MCSs) for each individual mobile station. To facilitate the mobile stations' CSI estimations, the network can configure and transmit CSI-RSs. At the same time, each mobile station can be configured to feed back an estimated precoding matrix indicator (PMI), channel quality information (CQI) and rank information (RI) by receiving and processing the CSI-RSs.

Traditionally, the mobile stations' CSI feedback is designed mainly targeting horizontal CSI associated with the azimuth angles. For example, PMI/CQI feedback for downlink beamforming in LTE informs the eNB of the horizontal direction (or the azimuth angle) along which the mobile station receives the strongest signal and the associated channel strength. When active antenna elements 306 are introduced in the vertical domain as well, vertical CSI feedback is included. The CSI-RS design provides for the corresponding vertical CSI feedback.

Figure 5:
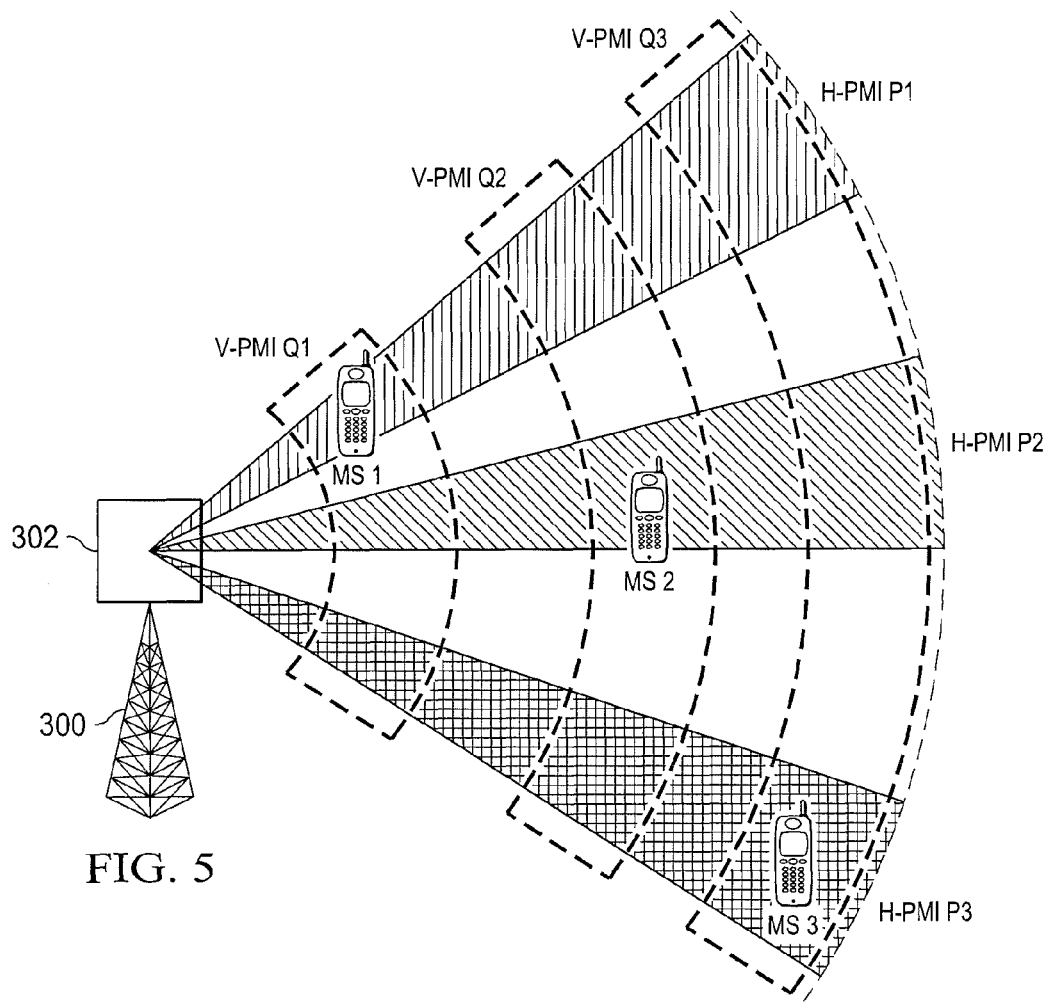
FIG. 5 illustrates horizontal precoding matrix indicators (PMIs) and vertical PMIs between mobile stations and the transmission point of FIG. 3 according to an embodiment of the disclosure.

FIG. 5 illustrates horizontal precoding matrix indicators (PMIs) and vertical PMIs between mobile stations and the transmission point 300 according to an embodiment of the disclosure.

The H-CSI of a mobile station is horizontal CSI estimated at the mobile station, which includes channel characteristics mainly associated with horizontally-placed antenna elements 306 at the transmission point 300. The horizontal CSI includes horizontal CQI (H-CQI), horizontal PMI (H-PMI) and horizontal RI (H-RI). For example, the H-CSI can be the same as the CSI (PMI, CQI and RI) in the legacy LTE system because the legacy LTE system CSI feedback contents and mechanism are designed based on a horizontal antenna array.

The V-CSI of a mobile station is vertical CSI estimated at the mobile station, which includes channel characteristics mainly associated with vertically-placed antenna elements 306 at the transmission point 300. The vertical CSI includes vertical CQI (V-CQI), vertical PMI (V-PMI) and vertical RI (V-RI).

In the illustrated embodiment, mobile station (MS) 1, MS 2 and MS 3 receive the strongest signal when the (H-PMI, V-PMI) pairs are (P1,Q1), (P2,Q2) and (P3,Q3), respectively, according to their respective horizontal directions (or azimuth angles) and vertical directions (or elevation angles). When configured to feed back H-PMIs, MS 1, MS 2 and MS 3 would report H-PMIs P1, P2 and P3, respectively. When configured to feed back V-PMIs, MS 1, MS 2 and MS 3 would report V-PMIs Q1, Q2 and Q3, respectively.

As for CQI, one example of a feedback method includes H-CQI and V-CQI being derived separately and then independently fed back to the network. A second example of a feedback method includes one joint CQI being derived and then fed back to the network for the N antenna channel.

In operation according to one embodiment, a mobile station constructs a desired precoding matrix for the N-Tx antenna channel using H-PMI and V-PMI and calculates a received power under the assumption that the transmission point 300 transmits signals using the desired precoding matrix. From the received power, the mobile station derives CQI, where the CQI can be a desired MCS. In one example, the desired precoding matrix is found by taking the Kronecker product of H-PMI=$[p_1, p_2, \ldots, p_{NH}]^t \in C^{NH \times 1}$ and V-PMI=$[q_1, q_2, \ldots, q_{NH}]^t \in C^{NH \times 1}$. In this case, when $N_H$=2, $N_V$=2, H-RI=1 and V-RI=1, the Kronecker product would be calculated as in the following:

$$H\text{-}PMI \otimes V\text{-}PMI = \begin{bmatrix} p_1 \\ p_2 \end{bmatrix} \otimes \begin{bmatrix} q_1 \\ q_2 \end{bmatrix} = \begin{bmatrix} p_1 q_1 \\ p_1 q_2 \\ p_2 q_1 \\ p_2 q_2 \end{bmatrix},$$

and $$V\text{-}PMI \otimes H\text{-}PMI = \begin{bmatrix} q_1 \\ q_2 \end{bmatrix} \otimes \begin{bmatrix} p_1 \\ p_2 \end{bmatrix} = \begin{bmatrix} q_1 p_1 \\ q_1 p_2 \\ q_2 p_1 \\ q_2 p_2 \end{bmatrix}.$$

Joint RI is the rank information about the MIMO channels between the N-Tx antenna and a number of receive antennas at the mobile station.

Figure 6:
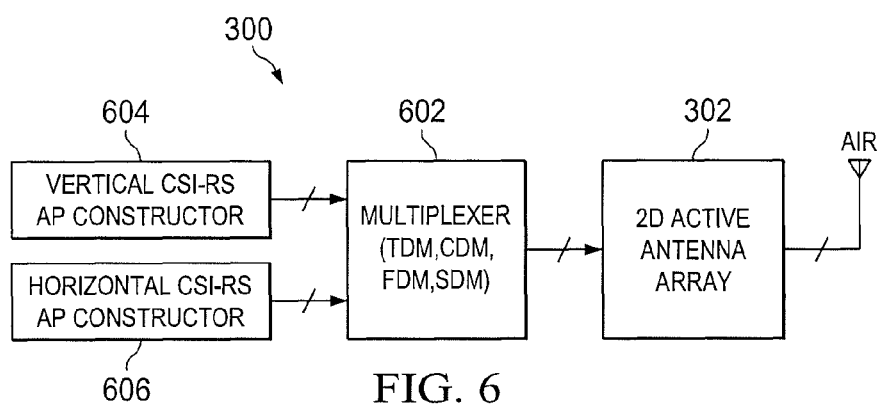
FIG. 6 illustrates the transmission point of FIG. 3 according to an embodiment of the disclosure.

FIG. 6 illustrates the transmission point 300 according to an embodiment of the disclosure. In the illustrated embodiment, the transmission point 300 comprises the 2D active antenna array 302, a multiplexer 602, a vertical CSI-RS access point (AP) constructor 604, and a horizontal CSI-RS AP constructor 606.

Thus, for this embodiment, two sets of CSI-RS APs out of the at least two sets of CSI-RS APs are constructed separately: one set includes $N_V$ vertical CSI-RS (V-CSI-RS) APs, and the other set includes $N_H$ horizontal CSI-RS (H-CSI-RS) APs. Here, the horizontal CSI-RS APs are used for mobile stations' horizontal CSI (H-CSI) estimations, and the vertical CSI-RS APs are used for mobile stations' vertical CSI (V-CSI) estimations.

When a mobile station is configured with $N_V$ V-CSI-RS APs and $N_H$ H-CSI-RS APs, the mobile station can assume that the total number of antenna ports at the transmission point 300 is N=$N_H \times N_V$ for deriving at least one of joint CQI and joint PMI for the N antenna channels. In another design, the total number of antenna ports at the transmission point 300 is separately signaled to the mobile station.

H-CSI-RS is associated with an H-PMI codebook and V-CSI-RS is associated with a V-PMI codebook. For some embodiments, the H-PMI codebook and the V-PMI codebook may be identical. In one alternative, 3GPP LTE Rel-8 and Rel-10 2-Tx, 4-Tx and 8-Tx DL codebooks may be reused for both H-PMI and V-PMI. In another alternative, 3GPP LTE Rel-8 and Rel-10 2-Tx, 4-Tx, and 8-Tx DL codebooks may be reused for the H-PMI codebook only and the V-PMI codebook may be newly designed. In yet another alternative, both the H-PMI and the V-PMI codebooks may be newly designed.

The CSI-RS configuration may include a CSI-RS type field to indicate whether the configured CSI-RS is H-CSI-RS or V-CSI-RS. When a mobile station is configured with H-CSI-RS, the mobile station derives a PMI (H-PMI) using the H-PMI codebook with estimating channels using H-CSI-RS; on the other hand, when the mobile station is configured with V-CSI-RS, the mobile station derives a PMI (V-PMI) using the V-PMI codebook with estimating channels using V-CSI-RS.

Similarly, the CSI-RS configuration may include a PMI codebook information field to indicate which PMI codebook should be used for deriving PMI using the configured CSI-RS. When a mobile station receives a configuration signaling of a CSI-RS and a H-PMI codebook, the mobile station derives a PMI (H-PMI) using the H-PMI codebook with estimating channels using the configured CSI-RS; on the other hand, when a mobile station receives a configuration signaling of a CSI-RS and a V-PMI codebook, the mobile station derives a PMI (V-PMI) using the V-PMI codebook with estimating channels using the configured CSI-RS.

Figure 7A:
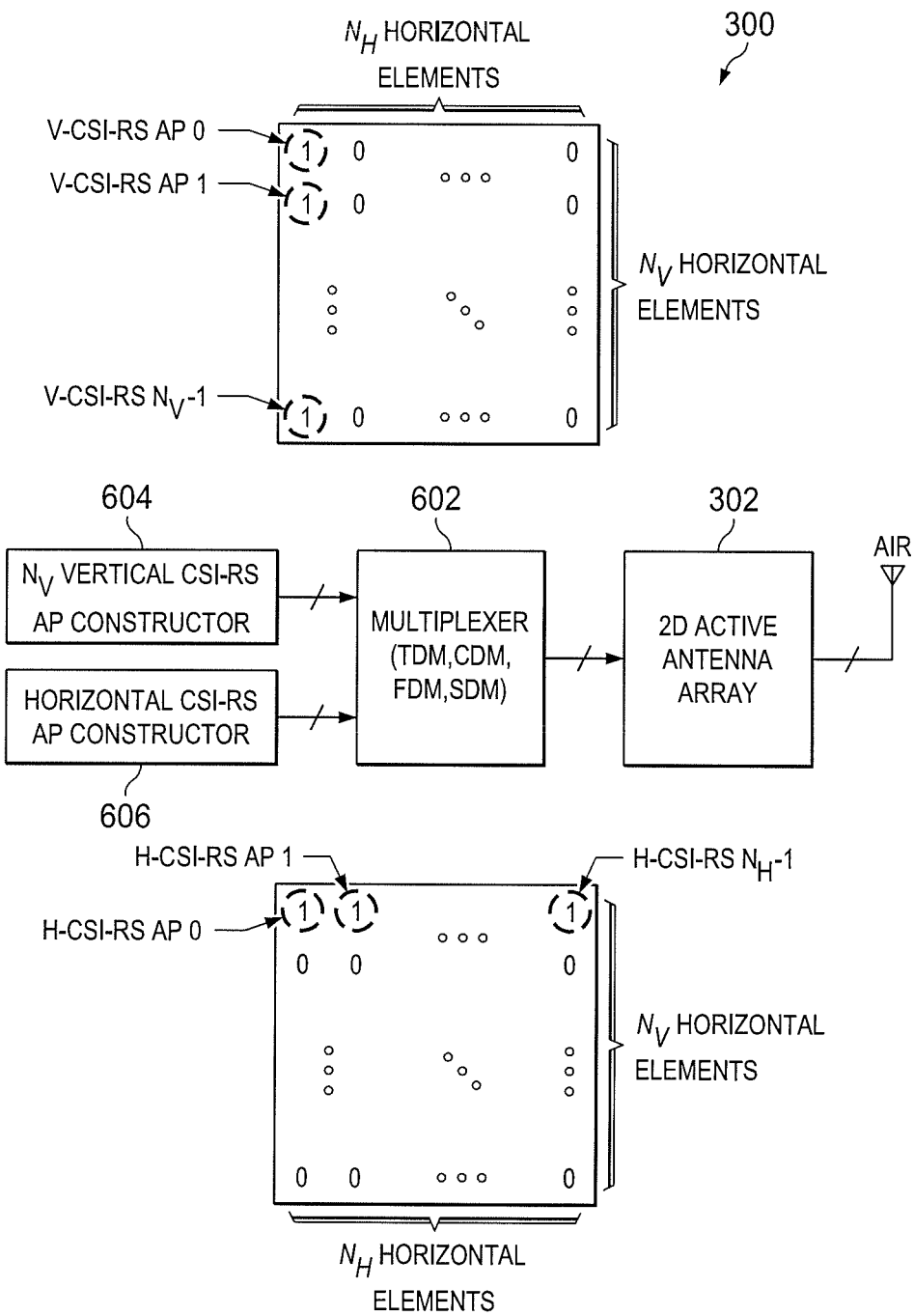
FIG. 7A illustrates a first configuration of horizontal and vertical channel state information-reference signal (CSI-RS) access points (APs) in the transmission point of FIG. 6 according to an embodiment of the disclosure.

FIG. 7A illustrates a first configuration of horizontal and vertical channel state information-reference signal (CSI-RS) access points (APs) in the transmission point 300 of FIG. 6 according to an embodiment of the disclosure.

For this embodiment, each of the $N_H$ horizontal CSI-RS APs (for example, H-APs 0, . . . , $N_H$–1) is transmitted from a row of the active antenna array 302, while each of the $N_V$ vertical CSI-RS APs (for example, V-APs 0, . . . , $N_V$–1) is transmitted from a column of the active antenna array 302. In the particular example illustrated in FIG. 7A, the horizontal CSI-RS APs are transmitted from the first row of the antenna array 302, while the vertical CSI-RS APs are transmitted from the first column of the antenna array 302.

When the H-CSI-RS and V-CSI-RS are transmitted in the same sub-frame, one CSI-RS AP can be shared between the two sets of the CSI-RS APs. For example, only a single CSI-RS signal mapped onto single-port CSI-RS REs is transmitted for H-AP 0 and V-AP 0. On the other hand, the H-CSI-RS and V-CSI-RS can also be mapped orthogonally and independently in the time-frequency grid, even if the two CSI-RS APs are scheduled in the same sub-frame.

The IE CSI-RS-Config is used to specify the CSI (Channel-State Information) reference signal configuration.

| CSI-RS-Config field descriptions |
| --- |
| antennaPortsCount |
| Parameter represents the number of antenna ports used for transmission of CSI reference signals where and corresponds to 1 antenna port, an2 to 2 antenna ports, etc. see TS 36.211 [21, 6.10.5]. |
| p-C |
| Parameter: $P_c$, see TS 36.213 [23, 7.2.5]. |
| resourceConfig |
| Parameter: CSI reference signal configuration, see TS 36.211 [21, table 6.10.5.2-1 and 6.10.5.2-2]. |
| subframeConfig |
| Parameter: $I_{CSI-RS}$, see TS 36.211 [21, table 6.10.5.3-1]. |
| zero TxPowerResourceConfigList |
| Parameter: ZeroPowerCSI-RS, see TS 36.211 [21, 6.10.5.2]. |
| zeroTxPowerSubframeConfig |
| Parameter: $I_{CSI-RS}$, see TS 36.211 [21, table 6.10.5.3-1]. |

Figure 7B:
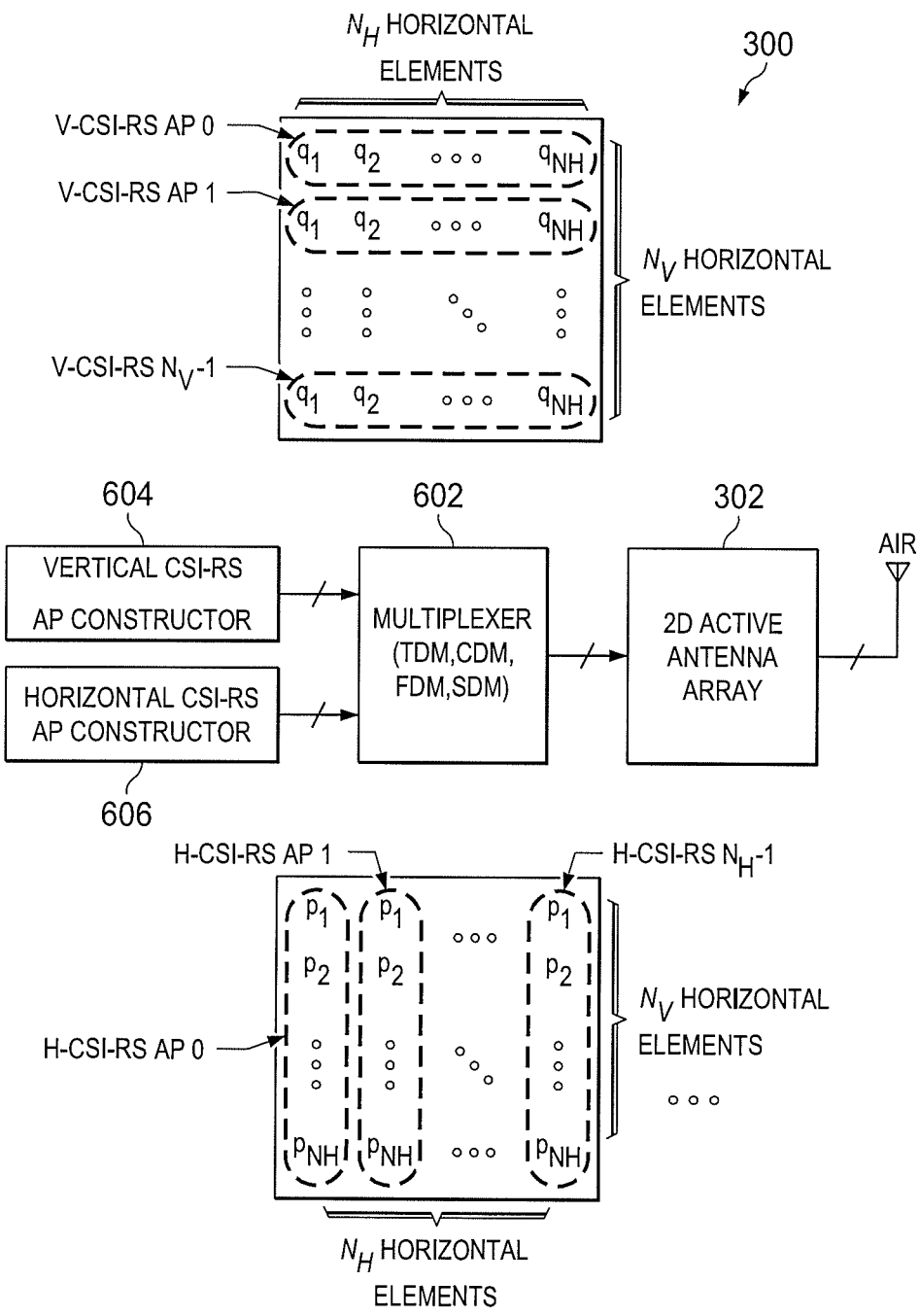
FIG. 7B illustrates a second configuration of horizontal and vertical CSI-RS APs in the transmission point of FIG. 6 according to an embodiment of the disclosure.

FIG. 7B illustrates a second configuration of horizontal and vertical CSI-RS APs in the transmission point 300 of FIG. 6 according to an embodiment of the disclosure.

For this embodiment, each of the $N_H$ horizontal CSI-RS for the $N_H$ H-CSI-RS APs (for example, H-APs 0, . . . , $N_H$–1) is transmitted from a column of the active antenna array 302. Each H-CSI-RS signal is precoded with a precoding vector of $[p_1\ p_2\ \ldots\ p_{NV}]^t$, where the precoding is applied across the antenna elements 306 (not shown in FIG. 7B) in each column of the active antenna array 302. On the other hand, each of the $N_V$ vertical CSI-RS for the $N_V$ APs (for example, V-APs 0, . . . , $N_V$–1) is transmitted from a row of the active antenna array 302. Each H-CSI-RS signal is precoded with a precoding vector of $[q_1\ q_2\ \ldots\ q_{NH}]$, where the precoding is applied across the antenna elements 306 in each row of the active antenna array 302.

It will be understood that the example illustrated in FIG. 7B may be easily extended to a construction in which different precoding vectors are applied across different rows (or columns) corresponding to the different V-CSI-RS (or H-CSI-RS).

For the following description of this disclosure, the terms "three-dimensional (3D) beamforming," "3D spatial multiplexing" and "massive MIMO transmissions" are used interchangeably.

A configuration for associating a CSI feedback reporting process and CSI-RS may be provided. A mobile station can receive multiple CSI-RS configurations, where each configuration instructs the mobile station to estimate CSI and/or long-term channel statistics, such as RSRP/RSRQ, using the configured set of CSI-RS APs. Meanwhile, the mobile station may also receive multiple periodic CSI reporting configurations for a cell.

In this case, the mobile station may be notified which set of CSI-RS APs to use for estimating channels for the periodic CSI reporting. In addition, the mobile station may select a subset of CSI out of all those CSIs estimated by the multiple sets of the configured CSI-RS APs for aperiodic CSI reporting. In this case, both of the eNB and the mobile station have the same understanding on the contents of the reported aperiodic CSI sets and which sets of configured CSI-RS APs have been used to generate the reported aperiodic CSI sets.

Design options to align the mobile station's and the eNB's understanding on the CSI feedback, including CSI configuration group and CSI group ID, are described below. Radio resource control (RRC) parameters for configuring a set of CSI-RS APs and periodic reporting may be grouped under an integer-valued identifier, for example, $ID_{CSI}$. $ID_{CSI}$ is a CSI group ID, and the configurations associated with a CSI group ID are referred to as a CSI configuration group. It is noted that the physical meaning of $ID_{CSI}$ can be a transmission point (TP) identifier for a transmission point 300 in case of coordinated multi-point transmission.

Figure 8A:
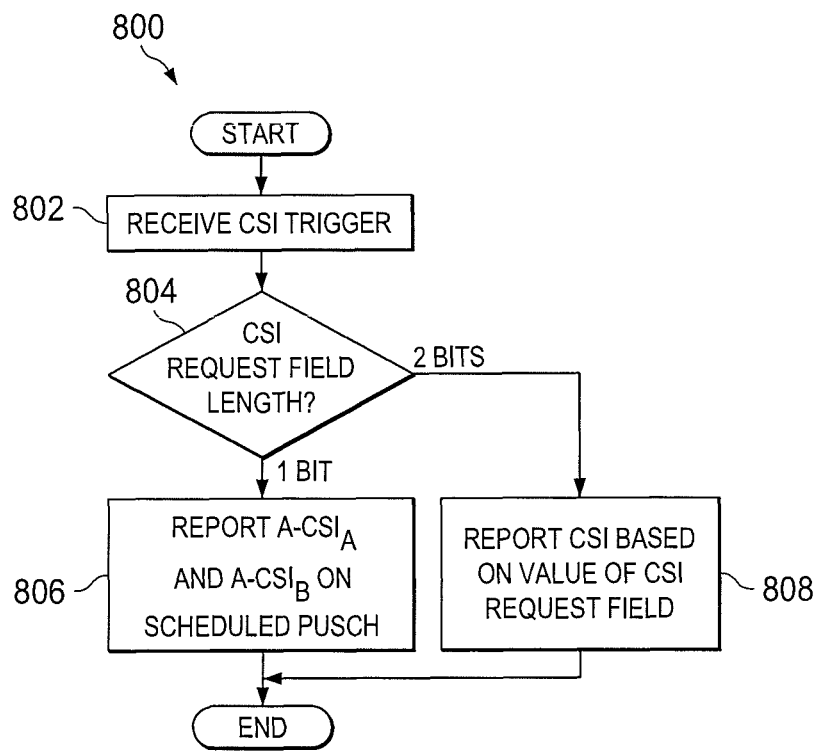
FIG. 8A illustrates a method for aperiodic channel state information reporting for a mobile station according to an embodiment of the disclosure.
Figure 8B:
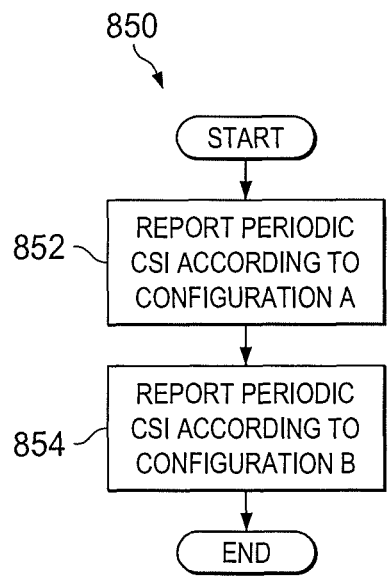
FIG. 8B illustrates a method for periodic channel state information reporting for a mobile station according to an embodiment of the disclosure.

As described below in connection with FIGS. 8A-B and 9A-C, a mobile station can be configured with multiple CSI configuration groups. FIG. 8A illustrates a method 800 for aperiodic channel state information reporting for a mobile station according to an embodiment of the disclosure, while FIG. 8B illustrates a method 850 for periodic channel state information reporting for a mobile station according to an embodiment of the disclosure. The methods 800 and 850 shown in FIGS. 8A and 8B are for illustration only. Reporting of channel state information may be provided in any other suitable manner without departing from the scope of this disclosure.

In this first alternative to form a CSI configuration group, at least one CSI-RS configuration and at least one of a periodic CSI reporting configuration and an aperiodic CSI reporting configuration are grouped under a CSI group ID.

For example, a mobile station may be configured with two CSI configuration groups as in the following:
CSI Configuration Group A:
  CSI group ID $ID_{CSI}$=A, where A is an integer.
  CSI-RS configuration A, including antennaPortCount, resourceConfig, and subframeConfig.
  Periodic CSI reporting configuration A.
  Aperiodic CSI reporting configuration (e.g., CSI feedback mode) A.

CSI Configuration Group B:
    CSI group ID $ID_{CSI}$=B, where B is an integer.
    CSI-RS configuration B, including antennaPortCount, resourceConfig, and subframeConfig.
    Periodic CSI reporting configuration B.
    Aperiodic CSI reporting configuration (e.g., CSI feedback mode) B.

For this example, the mobile station may report periodic CSI and aperiodic CSI as described below.

For the method 800 of FIG. 8A, a channel state information (CSI) trigger is received (step 802). For example, aperiodic CSI (A-CSI) may be triggered by a CSI request field of an UL grant (DCI format 0/4). For this embodiment, two scenarios and their associated mobile station behaviours are described below as examples. A-$CSI_A$ and A-$CSI_B$ denote aperiodic CSI generated according to aperiodic CSI reporting configurations A and B, respectively. Also, A-$CSI_A$ and A-$CSI_B$ are estimated with CSI-RS transmitted according to CSI-RS configurations A and B, respectively.

For a first scenario, when a one-bit CSI request field triggers the A-CSI (step 804), the mobile station reports both A-$CSI_A$ and A-$CSI_B$ on the PUSCH scheduled by the UL grant (step 806). Here, the CSI bits may be arranged in an increasing order of $ID_{CSI}$. For example, when B>A, the CSI bits are arranged as [A-$CSI_A$, A-$CSI_B$], and the CSI bits enter the channel coding block as an input. In some cases, each A-CSI may be composed of different types of CSI. In one example, A-$CSI_A$ may be composed of CQI/$PMI_A$ and $RI_A$, and B-$CSI_A$ may be composed of CQI/$PMI_B$ and $RI_B$. Then, CSI bits may be arranged separately per each type (i.e., CQI/PMI bits are arranged as CQI/PMI=[CQI/$PMI_A$, CQI/$PMI_B$] and RI bits are arranged as RI=[$RI_A$, $RI_B$]). CQI/PMI and RI may go through different coding chains and be mapped separately on different PUSCH resource elements. It is noted that the method can be extended to the case where N CSI configuration groups are configured, in which case all the N A-CSIs are transmitted on the scheduled PUSCH.

For a second scenario, when a two-bit CSI request field triggers the A-CSI (similarly to Rel-10 carrier aggregation case) (step 804), the mobile station reports CSI according to the state indicated in the two-bit CSI request field (step 808). One example of a CSI request field construction is shown in Table 1, where it is assumed that one CSI-RS (or one CSI configuration group) is configured as primary. Thus, Table 1 illustrates CSI Request fields for PDCCH with uplink DCI format in mobile station specific search space.

TABLE 1

| Value of CSI request field | Description |
|---|---|
| 00 | No aperiodic CSI report is triggered. |
| 01 | Aperiodic CSI report estimated with CSI-RS having the primary $ID_{CSI}$ is triggered. (Alternatively, aperiodic CSI report generated according to the configurations in the primary CSI configuration group is triggered.) |
| 10 | Aperiodic CSI report estimated with CSI-RS corresponding to a first RRC configured set of $ID_{CSI}$'s is triggered. (Alternatively, aperiodic CSI report generated according to the configurations in a first |

TABLE 1-continued

| Value of CSI request field | Description |
|---|---|
|  | RRC configured subset of CSI configuration groups is triggered.) |
| 11 | Aperiodic CSI report estimated with CSI-RS corresponding to a second RRC configured set of $ID_{CSI}$'s is triggered. (Alternatively, aperiodic CSI report generated according to the configurations in a second RRC configured subset of CSI configuration groups is triggered.) |

For the method 850 of FIG. 8B, the mobile station reports periodic CSI according to the periodic CSI reporting configuration A, where the CSI is estimated with the CSI-RS transmitted according to CSI-RS configuration A (step 852). The mobile station reports periodic CSI according to the periodic CSI reporting configuration B, where the CSI is estimated with the CSI-RS transmitted according to CSI-RS configuration B (step 854).

Although FIGS. 8A and 8B each illustrate one example of a method 800 and 850 for reporting channel state information for a mobile station, various changes may be made to FIGS. 8A and 8B. For example, while shown as a series of steps, various steps in FIG. 8A or 8B could overlap, occur in parallel, occur in a different order, or occur multiple times.

FIG. 9A illustrates a method 900 for configuring a mobile station for channel state information reporting according to an embodiment of the disclosure. FIG. 9B illustrates a method 920 for aperiodic channel state information reporting for a mobile station configured according to the method 900 according to an embodiment of the disclosure. FIG. 9C illustrates a method 940 for periodic channel state information reporting for a mobile station configured according to the method 900 according to an embodiment of the disclosure. The methods 900, 920 and 940 shown in FIGS. 9A-C are for illustration only. Configuration of the mobile station and reporting of channel state information may be provided in any other suitable manner without departing from the scope of this disclosure.

In this second alternative to form a CSI configuration group, a mobile station may be configured with one primary CSI group ID (or $ID_{CSI}$) (e.g., of a primary transmission point) and a number of secondary $ID_{CSI}$'s (e.g., of secondary transmission points) by RRC (step 902). For some embodiments, the primary $ID_{CSI}$ may be a constant, e.g., 0, and the secondary $ID_{CSI}$'s may be RRC configured. For other embodiments, the primary and the secondary $ID_{CSI}$'s may each be RRC configured. An $ID_{CSI}$ is included in each of a CSI-RS configuration and a periodic CSI reporting configuration (step 904).

For aperiodic CSI reporting as in method 920, the mobile station can receive from the eNB an UL grant comprising a CSI request field (step 922). Based on the value of the CSI request field, the mobile station can determine a set of $ID_{CSI}$'s conveyed by the eNB that indicate the CSI to be reported on a scheduled PUSCH (step 924). Based on the CSI indicated by the eNB in the CSI request field, the mobile station reports the CSI estimated with the CSI-RS received according to each of the CSI-RS configurations whose $ID_{CSI}$ is an element of the set of $ID_{CSI}$'s (step 926). In one example, this indication can be done by defining a table for the CSI request field to be included in a UL DCI format (for example, as in Table 1).

When the mobile station is providing periodic CSI reporting as in method 940, the mobile station estimates the periodic CSI by a set of CSI-RS APs received according to the CSI-RS configuration having the same CSI group ID as the periodic CSI reporting configuration (step 942). The mobile station reports the estimated periodic CSI according to the periodic CSI reporting configuration (step 944).

Although FIGS. 9A-C each illustrate one example of a method 900, 920 and 940 for configuring a mobile station or reporting channel state information for a mobile station, various changes may be made to FIGS. 9A-C. For example, while shown as a series of steps, various steps in FIGS. 9A-C could overlap, occur in parallel, occur in a different order, or occur multiple times.

Following is a description of a configuration of CSI reporting for 3D beamforming. For a configured serving cell, a mobile station can be configured to feedback CSI for a 3D beamforming (or massive MIMO) transmission scheme.

For this purpose, an information element (or field), such as information element (IE) X, can be defined according to Table 2. IE X may be explicitly RRC configured for each CSI configuration group to indicate whether the mobile station will feedback CSI for massive MIMO or for legacy MIMO when CSI feedback is instructed for each CSI configuration group. Table 2 illustrates a configuration of CSI contents for this example.

TABLE 2

| States of IE X | CSI contents |
| --- | --- |
| 0 | CSI for legacy MIMO |
| 1 | CSI for 3D beamforming |

Table 3 below illustrates some examples for configuring CSI configuration groups for 3D beamforming.

TABLE 3

| | Details of CSI-RS group configurations |
| --- | --- |
| Example 1 | CSI configuration group n:<br>CSI group ID $D_{CSI}$ = n, where n is an integer.<br>CSI-RS configuration n, including antennaPortCount, resourceConfig, and subframeConfig.<br>Periodic CSI reporting configuration n.<br>Aperiodic CSI reporting configuration (e.g., CSI feedback mode) n.<br>IE X = $X_n$.<br>In this case, a mobile station shall report periodic and aperiodic CSI for CSI configuration group n depending on the IE X = $X_n$, according to Table 2. |
| Example 2 | CSI configuration group n:<br>CSI group ID IDCSI = n, where n is an integer.<br>CSI-RS configuration n, including antennaPortCount, resourceConfig, and subframeConfig, and IE X = Xn.<br>Periodic CSI reporting configuration n.<br>Aperiodic CSI reporting configuration (e.g., CSI feedback mode) n.<br>In this case, a mobile station shall report periodic and aperiodic CSI for CSI configuration group n depending on the IE X = Xn, according to Table 2. |
| Example 3 | CSI configuration group n:<br>CSI group ID IDCSI = n, where n is an integer.<br>Either<br>Vertical CSI-RS configuration n, including antennaPortCount, resourceConfig, subframeConfig.<br>Horizontal CSI-RS configuration n, including antennaPortCount, resourceConfig, subframeConfig.<br>Or<br>Legacy CSI-RS configuration n, including antennaPortCount, resourceConfig, and subframeConfig.<br>Periodic CSI reporting configuration n.<br>Aperiodic CSI reporting configuration (e.g., CSI feedback mode) n.<br>In this case, a mobile station shall report periodic and aperiodic CSI for CSI configuration group n, depending on whether vertical and horizontal CSI-RS or a legacy CSI-RS is configured. If vertical and horizontal CSI-RS are configured, the CSI feedback contents shall be for 3D beamforming; otherwise, the CSI feedback contents shall be for legacy MIMO. |
| Example 4 | CSI configuration group n:<br>CSI group ID IDCSI = n, where n is an integer.<br>Either<br>Vertical CSI configuration n:<br>Vertical CSI-RS configuration n, including antennaPortCount, resourceConfig, subframeConfig.<br>Periodic CSI reporting configuration n for vertical CSI-RS.<br>Horizontal CSI configuration n:<br>Horizontal CSI-RS configuration n, including antennaPortCount, resourceConfig, subframeConfig.<br>Periodic CSI reporting configuration n for horizontal CSI-RS.<br>Or<br>Legacy CSI configuration n:<br>CSI-RS configuration n, including antennaPortCount, resourceConfig, and subframeConfig.<br>Periodic CSI reporting configuration n.<br>Aperiodic CSI reporting configuration (e.g., CSI feedback mode) n.<br>In this case, a mobile station shall report aperiodic CSI for CSI configuration group n, depending on whether vertical and horizontal CSI-RS or a legacy CSI-RS is configured. If vertical and horizontal CSI-RS are configured, the CSI feedback contents shall be for 3D beamforming; otherwise, the CSI feedback contents shall be for legacy MIMO. The mobile station shall report periodic CSI for vertical, horizontal and legacy according to the respective CSI configurations. |
| Example 5 | CSI configuration group n:<br>CSI group ID $ID_{CSI}$ = n, where n is an integer.<br>Either<br>Legacy CSI-RS configuration n, including antennaPortCount, resourceConfig, and subframeConfig.<br>Periodic CSI reporting configuration n.<br>Or<br>A new joint CSI-RS configuration n.<br>Either<br>Periodic CSI reporting configuration n; V-CSI and H-CSI are jointly fed back.<br>Or<br>Periodic V-CSI reporting configuration n: for V-CSI<br>Periodic H-CSI reporting configuration n: for H-CSI<br>Aperiodic CSI reporting configuration (e.g., CSI feedback mode) n.<br>In this case, a mobile station shall report aperiodic CSI for CSI configuration group n, depending on whether the new joint CSI-RS or a legacy CSI-RS is configured. If the new joint CSI-RS are configured, the CSI feedback contents shall be for 3D beamforming; otherwise, the CSI feedback contents shall be for legacy MIMO.<br>The new joint CSI-RS configuration may include the following fields:<br>subframeConfig: a common subframe configuration for both vertical and horizontal CSI-RS.<br>V-antennaPortCount: number of antenna ports for vertical CSI-RS<br>H-antennaPortCount: number of antenna ports for horizontal CSI-RS<br>V-resourceConfig: resource configuration for vertical CSI-RS<br>H-resourceConfig: resource configuration for horizontal CSI-RS |

For aperiodic CSI, the mobile station may feed back aperiodic CSI according to Table 1, i.e., according to the state of CSI request field and the configurations in each CSI-RS configuration group.

For some embodiments, periodic CSI reporting is configured separately for V-CSI and H-CSI, while aperiodic CSI reporting is configured for both V-CSI and H-CSI. In this case, according to the configurations, periodic V-CSI and H-CSI may be reported in separately configured physical channels (e.g., on PUCCHs in two different sub-frames), and aperiodic V-CSI and H-CSI may be reported simultaneously on a single PUSCH scheduled by a UL grant.

Calculation and reporting of CQI/PMI/RI for 3D beamforming is described below. From each of H-CSI-RS and V-CSI-RS, a mobile station can calculate (H-RI, H-PMI, H-CQI) and (V-RI, V-PMI, V-CQI) that can be used by eNB for each of the horizontal and the vertical 2D beamforming transmission with achieving a % block error probability (for example, α=10). However, when eNB wants to apply 3D beamforming to the mobile station, the individual feedback information may not be sufficient to derive RI, PMI, CQI for the 3D beamforming. For example, it is not clear how eNB derives rank and MCS (or CQI) to be used for achieving a % block error rate when the individual feedbacks are (H-RI, V-RI).

For some embodiments, a Kronecker-product-based feedback design may be implemented. For these embodiments, one design option is to have the eNB use a rank and a precoding matrix for a 3D beamforming transmission to a mobile station, where the rank and the precoding matrix are obtained from the mobile station's H-PMI/V-PMI/H-RI/V-RI feedback as described below.

The rank for the 3D beamforming transmission may be obtained by taking the product of horizontal rank and vertical rank for 3D beamforming transmission for a mobile station. Here, the horizontal and the vertical ranks can be reported by the mobile station, e.g., in terms of H-RI and V-RI.

(Rank for 3D beamforming)=(Rank of horizontal channels)×(Rank of vertical channels).

The precoding matrix for the 3D beamforming transmission may be obtained by taking the Kronecker product of a horizontal precoding matrix and a vertical precoding matrix. Here, the horizontal and the vertical precoding matrices can be reported by the mobile station, e.g., in terms of H-PMI and V-PMI.

(Precoding matrix for 3D beamforming)=(Horizontal precoding matrix)⊗(Vertical precoding matrix)

For facilitating this 3D beamforming transmission of eNB, the mobile station can calculate CSI for the 3D beamforming as described below.

For each precoding matrix for the 3D beamforming (i.e., a Kronecker product of a horizontal precoding matrix and a vertical precoding matrix, where the horizontal and the vertical precoding matrices are selected from a horizontal and a vertical precoder codebooks, respectively), the mobile station determines an MCS to achieve α % block error rate when the precoding matrix is used.

Among all the precoding matrices the mobile station has considered, the mobile station selects one precoding matrix and a corresponding MCS for CSI feedback according to at least one criterion, e.g., the precoding matrix that achieves the largest received SINR.

The selected precoding matrix can be decomposed into a horizontal precoding matrix and a vertical precoding matrix. The H-PMI, V-PMI, H-RI and V-RI are selected according to the selected horizontal and vertical precoding matrices, respectively. The corresponding MCS will be the joint CQI for the 3D beamforming.

Discrete Fourier Transform (DFT) codebooks can quantize correlated multi-antenna channels. Hence, in a case where multi-antenna V- or H-channels are correlated, DFT codebooks can be used for quantizing each of the V- and H-channels. An N-bit DFT codebook is constructed with the $(2^N \times 2^N)$ DFT matrix whose examples are shown below, where each column corresponds to a rank-1 precoding codeword of the DFT codebook.

$$\begin{bmatrix} 1 & 1 & 1 & \cdots & 1 \\ 1 & e^{j2\pi\frac{1}{N}} & e^{j2\pi\frac{2\cdot 1}{N}} & \cdots & e^{j2\pi\frac{(N-1)\cdot 1}{N}} \\ 1 & e^{j2\pi\frac{2}{N}} & e^{j2\pi\frac{2\cdot 2}{N}} & \cdots & e^{j2\pi\frac{(N-1)\cdot 2}{N}} \\ 1 & \vdots & \vdots & \ddots & \vdots \\ 1 & e^{j2\pi\frac{N-1}{N}} & e^{j2\pi\frac{2\cdot(N-1)}{N}} & \cdots & e^{j2\pi\frac{(N-1)\cdot(N-1)}{N}} \end{bmatrix}$$

or $$\begin{bmatrix} 1 & 1 & 1 & \cdots & 1 \\ 1 & e^{-j2\pi\frac{1}{N}} & e^{-j2\pi\frac{2\cdot 1}{N}} & \cdots & e^{-j2\pi\frac{(N-1)\cdot 1}{N}} \\ 1 & e^{-j2\pi\frac{2}{N}} & e^{-j2\pi\frac{2\cdot 2}{N}} & \cdots & e^{-j2\pi\frac{(N-1)\cdot 2}{N}} \\ 1 & \vdots & \vdots & \ddots & \vdots \\ 1 & e^{-j2\pi\frac{N-1}{N}} & e^{-j2\pi\frac{2\cdot(N-1)}{N}} & \cdots & e^{-j2\pi\frac{(N-1)\cdot(N-1)}{N}} \end{bmatrix}.$$

In some embodiments, the codebook for V-PMI includes some components from a $B_V$-bit DFT codebook, while the codebook for H-PMI is the same as Rel-8 and Rel-10 codebook. Here, $B_V$ can be the number of feedback bits for a V-PMI reporting on PUCCH. In one example, the V-PMI codebook is a $B_V$-bit DFT codebook.

In some embodiments, the codebook for V-PMI and H-PMI includes some components from a $B_V$-bit DFT codebook and $B_H$-bit DFT codebook, respectively. Here, $B_V$ and $B_H$ can be the number of feedback bits for a V-PMI and a H-PMI reporting on PUCCH, respectively. In one example, the V-PMI and the H-PMI codebooks are a $B_V$-bit DFT codebook and a $B_H$-bit DFT codebook, respectively. Then, the mobile station feeds back H-PMI, H-RI, V-PMI, V-RI and the joint CQI.

In some embodiments providing rank-restriction for one dimension, for facilitating more resource-efficient feedback (or for reducing a number of bits to be fed back), a rank-restriction may be imposed on one dimension out of the horizontal and the vertical dimensions when deriving a PMI on the one dimension. In some scenarios, for example, vertical spatial channels do not efficiently support rank>$T_V$ (where $T_V$ is a vertical threshold rank), in which case a feedback scheme can be devised to derive V-PMI and V-RI under a constraint that the rank of the vertical channels is ≤$T_V$.

In one example, the threshold rank $T_V$=1. Then, a mobile station derives the V-PMI based on the assumption that the rank of the vertical channel is one and feeds back H-PMI, H-RI, V-PMI and the joint CQI (without V-RI).

A particular rank for the 3D beamforming can be obtained with different pairs of ranks of the horizontal and the vertical channels. For one example, an eNB has four vertical and four horizontal antenna elements 306, and the eNB has configured V-CSI-RS APs and 4 H-CSI-RS-APs to a mobile station. In this example, rank 4 can be achieved with three different horizontal and vertical ranks, with (horizontal rank, vertical rank)=(2, 2), (1, 4) and (4, 1).

In a first case to have rank 4, the mobile station derives the joint CQI for a rank-2 horizontal precoding matrix W and a rank-2 vertical precoding matrix V, and the mobile station derives the Kronecker product of the two precoding matrices and obtains a rank-4 16-Tx joint precoding matrix U, as in the following:

$$W = \begin{bmatrix} w_{11} & w_{21} \\ w_{12} & w_{22} \\ w_{13} & w_{23} \\ w_{14} & w_{24} \end{bmatrix},$$

$$V = \begin{bmatrix} v_{11} & v_{21} \\ v_{12} & v_{22} \\ v_{13} & v_{23} \\ v_{14} & v_{24} \end{bmatrix},$$

$$U = W \otimes V$$

$$= \begin{bmatrix} w_{11} & w_{21} \\ w_{12} & w_{22} \\ w_{13} & w_{23} \\ w_{14} & w_{24} \end{bmatrix} \otimes \begin{bmatrix} v_{11} & v_{21} \\ v_{12} & v_{22} \\ v_{13} & v_{23} \\ v_{14} & v_{24} \end{bmatrix}$$

$$= \begin{bmatrix} w_{11}v_{11} & w_{11}v_{21} & w_{21}v_{11} & w_{21}v_{21} \\ w_{11}v_{12} & w_{11}v_{22} & w_{21}v_{12} & w_{21}v_{22} \\ w_{11}v_{13} & w_{11}v_{23} & w_{21}v_{13} & w_{21}v_{23} \\ w_{11}v_{14} & w_{11}v_{24} & w_{21}v_{14} & w_{21}v_{24} \\ w_{12}v_{11} & w_{12}v_{21} & w_{22}v_{11} & w_{22}v_{21} \\ w_{12}v_{12} & w_{12}v_{22} & w_{22}v_{12} & w_{22}v_{22} \\ w_{12}v_{13} & w_{12}v_{23} & w_{22}v_{13} & w_{22}v_{23} \\ w_{12}v_{14} & w_{12}v_{24} & w_{22}v_{14} & w_{22}v_{24} \\ w_{13}v_{11} & w_{13}v_{21} & w_{23}v_{11} & w_{23}v_{21} \\ w_{13}v_{12} & w_{13}v_{22} & w_{23}v_{12} & w_{23}v_{22} \\ w_{13}v_{13} & w_{13}v_{23} & w_{23}v_{13} & w_{23}v_{23} \\ w_{13}v_{14} & w_{13}v_{24} & w_{23}v_{14} & w_{23}v_{24} \\ w_{14}v_{11} & w_{14}v_{21} & w_{24}v_{11} & w_{24}v_{21} \\ w_{14}v_{12} & w_{14}v_{22} & w_{24}v_{12} & w_{24}v_{22} \\ w_{14}v_{13} & w_{14}v_{23} & w_{24}v_{13} & w_{24}v_{23} \\ w_{14}v_{14} & w_{14}v_{24} & w_{24}v_{14} & w_{24}v_{24} \end{bmatrix}.$$

The joint CQI would be the MCS achieving a % block error rate when the rank-4 precoding matrix is used for the 3D antenna channel constructed with (4-horizontal×4-vertical) elements.

In a second case to have rank 4, the mobile station derives the joint CQI for a rank-4 horizontal precoding matrix W and a rank-1 vertical precoding matrix V, and the mobile station derives the Kronecker product of the two precoding matrices and obtains a rank-4 16-Tx joint precoding matrix U, as in the following:

$$W = \begin{bmatrix} w_{11} & w_{21} & w_{31} & w_{41} \\ w_{12} & w_{22} & w_{32} & w_{42} \\ w_{13} & w_{23} & w_{33} & w_{43} \\ w_{14} & w_{24} & w_{34} & w_{44} \end{bmatrix}, V = \begin{bmatrix} v_{11} \\ v_{12} \\ v_{13} \\ v_{14} \end{bmatrix},$$

$$U = W \otimes V = \begin{bmatrix} w_{11} & w_{21} & w_{31} & w_{41} \\ w_{12} & w_{22} & w_{32} & w_{42} \\ w_{13} & w_{23} & w_{33} & w_{43} \\ w_{14} & w_{24} & w_{34} & w_{44} \end{bmatrix} \otimes \begin{bmatrix} v_{11} \\ v_{12} \\ v_{13} \\ v_{14} \end{bmatrix} = [\cdot]_{16 \times 4}.$$

The joint CQI would be the MCS achieving a % block error rate when the rank-4 precoding matrix is used for the 3D antenna channel constructed with (4-horizontal×4-vertical) elements.

In a third case to have rank 4, the mobile station derives the joint CQI for a rank-1 horizontal precoding matrix W and a rank-4 vertical precoding matrix V, and the mobile station derives the Kronecker product of the two precoding matrices and obtains a rank-4 16-Tx joint precoding matrix U, as in the following:

$$W = \begin{bmatrix} w_{11} \\ w_{12} \\ w_{13} \\ w_{14} \end{bmatrix}, V = \begin{bmatrix} v_{11} & v_{21} & v_{31} & v_{41} \\ v_{12} & v_{22} & v_{32} & v_{42} \\ v_{13} & v_{23} & v_{33} & v_{43} \\ v_{14} & v_{24} & v_{34} & v_{44} \end{bmatrix},$$

$$U = W \otimes V = \begin{bmatrix} w_{11} \\ w_{12} \\ w_{13} \\ w_{14} \end{bmatrix} \otimes \begin{bmatrix} v_{11} & v_{21} & v_{31} & v_{41} \\ v_{12} & v_{22} & v_{32} & v_{42} \\ v_{13} & v_{23} & v_{33} & v_{43} \\ v_{14} & v_{24} & v_{34} & v_{44} \end{bmatrix} = [\cdot]_{16 \times 4}.$$

The joint CQI would be the MCS achieving a % block error rate when the rank-4 precoding matrix is used for the 3D antenna channel constructed with (4-horizontal×4-vertical) elements.

Following are four alternative embodiments for CQI/PMI/RI reporting contents to be included for massive MIMO (or 3D beamforming).

For a first alternative, the contents include (H-PMI, V-PMI, H-RI, V-RI) and a joint CQI achieving a % block error rate with the set of PMIs and RIs.

For a second alternative, the contents include (H-PMI, V-PMI, and RI) and a joint CQI achieving a % block error rate with the set of PMIs and the RI. The 3D beamforming rank corresponding to RI for this alternative is the product of the horizontal and the vertical ranks. In other words, the 3D beamforming rank is the same as the product of the number of columns of the horizontal precoding matrix corresponding to the H-PMI and the number of columns of the vertical precoding matrix corresponding to the V-PMI. In addition, for cases in which vertical rank is restricted to be 1, V-RI does not need to be fed back as eNB already knows that the V-PMI fed back by the mobile station is for rank-1. Then, RI represents the horizontal rank (or H-RI).

For a third alternative, the contents include (PMI, RI) and a CQI achieving a % block error rate with the set of the PMI and the RI for the 3D antenna channel. For this alternative, the precoding matrix corresponding to the PMI has N rows and M columns. N is the total number of antenna ports, which can sometimes be calculated by $N_H \times N_V$, where $N_H$ is the number of H-CSI-RS APs and $N_V$ is the number of V-CSI-RS APs. M is the same as the rank number corresponding to the RI. Consideration may be given to the construction of joint PMI out of the Kronecker product codebook.

For a fourth alternative, the contents include (H-PMI, H-CQI, H-RI) and (V-PMI, V-CQI, V-RI), where H-CQI is the MCS achieving α % block error rate with the H-PMI and H-CQI; and V-CQI is the MCS achieving a % block error rate with the V-PMI and V-CQI.

It will be understood that additional suitable feedback contents may be included for each of these four alternatives.

CQI and PMI feedback types on PUSCH for 3D beamforming are described below.

For embodiments supporting various massive MIMO transmission modes for various channel environments, a mobile station may be able to be configured for a selected pair of PMI and CQI feedback types for aperiodic CSI feedback on PUSCH. For these embodiments, candidates for the CQI feedback type may include wideband CQI, mobile station-selected sub-band CQI, and higher-layer configured sub-band CQI. In addition, candidates for the PMI feedback type may include no PMI, a single pair of (H-PMI, V-PMI), multiple pairs of (H-PMI, V-PMI), a single H-PMI and multiple V-PMIs, and multiple H-PMIs and a single V-PMI.

In particular, a mobile station can be semi-statically configured by higher layers to feed back CQI and PMI and corresponding RI on the same PUSCH using one of the following CSI reporting modes given in Table 4 and described below. Thus, Table 4 illustrates massive MIMO CSI reporting modes and CQI/PMI feedback types.

matrix from the horizontal PMI codebook subset assuming transmission in the set of sub-bands; for each sub-band, the mobile station selects a preferred vertical precoding matrix from the vertical PMI codebook subset assuming transmission only in the sub-band; and if the reported RI>1, the reported PMI and CQI values may be calculated conditioned on the reported RI; otherwise, they may be reported conditioned on rank 1 (step 1002). The set of sub-bands (S) can be the entire downlink system bandwidth or can be mobile station-specifically configured.

The mobile station shall report one wideband CQI value per codeword, which is calculated assuming the use of a precoding matrix corresponding to the Kronecker product of the selected horizontal and vertical precoding matrices in each sub-band and transmission on set S sub-bands, report the selected horizontal precoding matrix for the set of sub-bands (S), and report the selected vertical precoding matrix for each set S sub-band (step 1004). For example, the mobile station may report a horizontal PMI corresponding to the selected horizontal precoding matrix, and the mobile station may report a vertical PMI corresponding to the selected vertical precoding matrix. Sub-band size may be given by Table 5, which illustrates sub-band size (k) vs. system bandwidth for some embodiments.

TABLE 4

|  |  | PMI Feedback Type | | | | |
| --- | --- | --- | --- | --- | --- | --- |
|  |  | No PMI | Single pair of (H-PMI, V-PMI) | Single H-PMI, Multiple V-PMIs | Multiple H-PMIs, Single V-PMI | Multiple pairs of (H-PMI, V-PMI) |
| PUSCH CQI Feedback Type | Wideband (wideband CQI) | Mode A-0 | Mode A-1 | Mode A-2 | Mode A-3 | Mode A-4 |
|  | Mobile station-selected (sub-band CQI) | Mode B-0 | Mode B-1 | Mode B-2 | Mode B-3 | Mode B-4 |
|  | Higher Layer-configured (sub-band CQI) | Mode C-0 | Mode C-1 | Mode C-2 | Mode C-3 | Mode C-4 |

The fourth and the fifth candidates for the PMI feedback type, i.e., (single H-PMI, multiple V-PMIs) and (multiple H-PMIs, single V-PMI), may be used for effectively supporting 2D massive MIMO transmissions with reduced PMI feedback overhead. These PMI feedback types may be implemented when the MIMO channel responses corresponding to either of H-PMI and V-PMI are flat in frequency domain.

Not all the modes in Table 4 may be configurable to a mobile station that receives massive MIMO transmissions. For example, mode A-0, which is a combination of (wideband CQI, no PMI), may not necessarily be transmitted on PUCCH because the number of feedback bits in mode A-0 is relatively small; the small number of feedback bits may be more efficiently transmitted on PUCCH.

Figure 10:
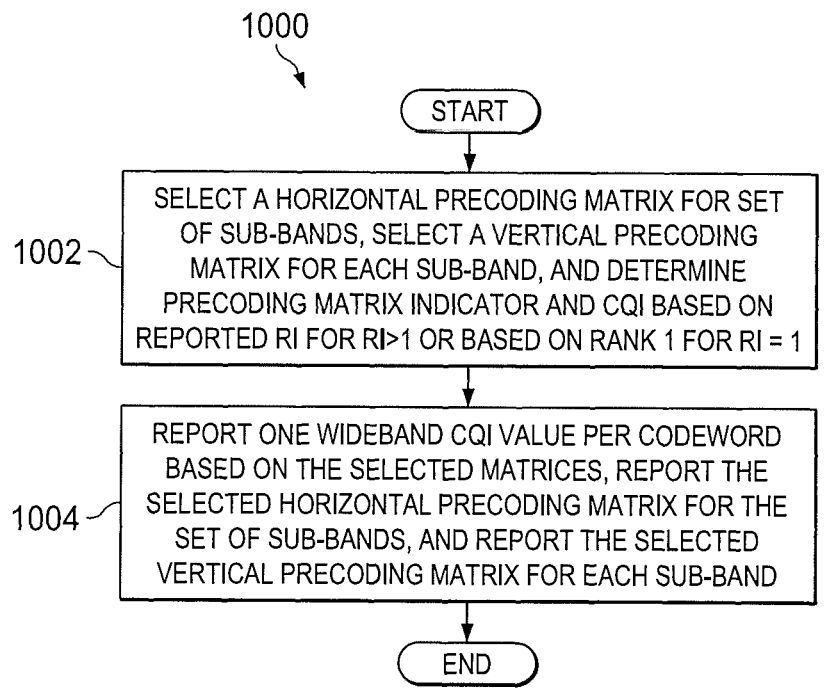
FIG. 10 illustrates a method for providing wideband feedback from a mobile station according to an embodiment of the disclosure.

Details of some reporting modes are described below in connection with FIGS. 10-14. FIG. 10 illustrates a method 1000 for providing wideband feedback for mode A-2 from a mobile station according to an embodiment of the disclosure. The method 1000 shown in FIG. 10 is for illustration only. Wideband feedback may be provided in any other suitable manner without departing from the scope of this disclosure.

For wideband feedback, mode A-2 includes (wideband CQI, single H-PMI, multiple V-PMIs). For the set of sub-bands (S) the mobile station shall evaluate for CQI reporting, the mobile station selects a preferred horizontal precoding

TABLE 5

| System Bandwidth $N_{RB}^{DL}$ | Sub-band Size (k) |
| --- | --- |
| 6-7 | NA |
| 8-10 | 4 |
| 11-26 | 4 |
| 27-63 | 6 |
| 64-110 | 8 |

Although FIG. 10 illustrates one example of a method 1000 for providing wideband feedback from a mobile station, various changes may be made to FIG. 10. For example, while shown as a series of steps, various steps in FIG. 10 could overlap, occur in parallel, occur in a different order, or occur multiple times.

Figure 11:
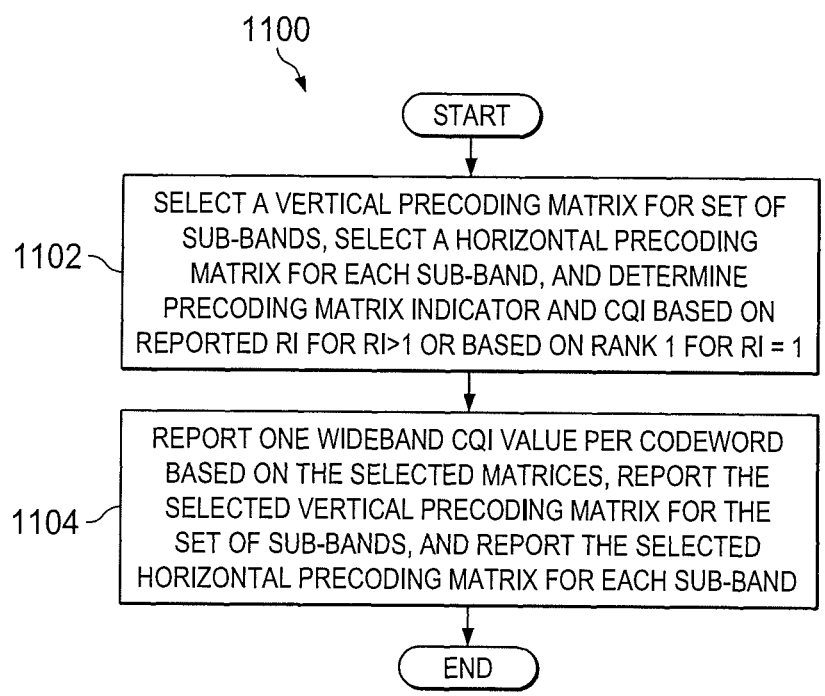
FIG. 11 illustrates a method for providing wideband feedback from a mobile station according to another embodiment of the disclosure.

FIG. 11 illustrates a method 1100 for providing wideband feedback for mode A-3 from a mobile station according to another embodiment of the disclosure. The method 1100 shown in FIG. 11 is for illustration only. Wideband feedback may be provided in any other suitable manner without departing from the scope of this disclosure.

For wideband feedback, mode A-3 includes (wideband CQI, multiple H-PMIs, single V-PMIs). For the set of sub-bands (S) the mobile station shall evaluate for CQI reporting, the mobile station selects a preferred vertical precoding matrix from the vertical PMI codebook subset assuming transmission in the set of sub-bands; for each sub-band, the mobile station selects a preferred horizontal precoding matrix from the horizontal PMI codebook subset assuming transmission only in the sub-band; and if the reported RI>1, the reported PMI and CQI values may be calculated conditioned on the reported RI; otherwise, they may be reported conditioned on rank 1 (step 1102). The set of sub-bands (S) can be the entire downlink system bandwidth or can be mobile station-specifically configured.

The mobile station shall report one wideband CQI value per codeword, which is calculated assuming the use of a precoding matrix corresponding to the Kronecker product of the selected horizontal and vertical precoding matrices in each sub-band and transmission on set S sub-bands; report the selected vertical precoding matrix for the set of sub-bands (S); and report the selected horizontal precoding matrix for each set S sub-band (step 1104). For example, the mobile station may report a vertical PMI corresponding to the selected vertical precoding matrix, and the mobile station may report a horizontal PMI corresponding to the selected horizontal precoding matrix. Sub-band size may be given by, e.g., Table 5.

Although FIG. 11 illustrates one example of a method 1100 for providing wideband feedback from a mobile station, various changes may be made to FIG. 11. For example, while shown as a series of steps, various steps in FIG. 11 could overlap, occur in parallel, occur in a different order, or occur multiple times.

FIG. 12 illustrates a method 1200 for providing wideband feedback for mode A-4 from a mobile station according to yet another embodiment of the disclosure. The method 1200 shown in FIG. 12 is for illustration only. Wideband feedback may be provided in any other suitable manner without departing from the scope of this disclosure.

For wideband feedback, mode A-4 includes (wideband CQI, multiple pairs of (H-PMI, V-PMI)). For each sub-band, a mobile station selects a preferred pair of a vertical precoding matrix and a horizontal precoding matrix from the vertical and the horizontal PMI codebook subsets assuming transmission only in the sub-band; and if the reported RI>1, the reported PMI and CQI values may be calculated conditioned on the reported RI; otherwise, they may be reported conditioned on rank 1 (step 1202). The mobile station shall report one wideband CQI value per codeword, which is calculated assuming the use of a precoding matrix corresponding to the Kronecker product of the selected horizontal and vertical precoding matrices in each sub-band and transmission on set S sub-bands, and report the selected pair of vertical precoding matrix and horizontal precoding matrix for each set S sub-band (step 1204). For example, the mobile station may report a vertical PMI and a horizontal PMI corresponding to the selected pair of vertical and horizontal precoding matrices. Sub-band size may be given by, e.g., Table 5.

Although FIG. 12 illustrates one example of a method 1200 for providing wideband feedback from a mobile station, various changes may be made to FIG. 12. For example, while shown as a series of steps, various steps in FIG. 12 could overlap, occur in parallel, occur in a different order, or occur multiple times.

FIG. 13 illustrates a method 1300 for providing higher-layer configured sub-band feedback for mode C-0 from a mobile station according to an embodiment of the disclosure. The method 1300 shown in FIG. 13 is for illustration only. Higher-layer configured sub-band feedback may be provided in any other suitable manner without departing from the scope of this disclosure.

For higher layer-configured sub-band feedback, mode C-0 includes (wideband CQI and per-sub-band CQIs). A mobile station shall report a wideband CQI value, which is calculated assuming transmission on set S sub-bands and report one sub-band CQI value for each set S sub-band (step 1302). The set of sub-bands (S) can be the entire downlink system bandwidth or can be mobile station-specifically configured. The sub-band CQI value is calculated assuming transmission only in the sub-band.

Both the wideband and sub-band CQI represent channel quality for the first codeword, even when RI>1. For transmission mode 3, the reported CQI values are calculated conditioned on the reported RI. For other transmission modes, they are reported conditioned on rank 1.

Although FIG. 13 illustrates one example of a method 1300 for providing higher-layer configured sub-band feedback from a mobile station, various changes may be made to FIG. 13. For example, while shown as a series of steps, various steps in FIG. 13 could overlap, occur in parallel, occur in a different order, or occur multiple times.

FIG. 14 illustrates a method 1400 for providing higher-layer configured sub-band feedback for mode C-1 from a mobile station according to another embodiment of the disclosure. The method 1400 shown in FIG. 14 is for illustration only. Higher-layer configured sub-band feedback may be provided in any other suitable manner without departing from the scope of this disclosure.

For higher layer-configured sub-band feedback, mode C-1 includes (CQI and per-sub-band CQIs, and a single pair of H- and V-PMIs). A mobile station selects a single precoding matrix from the codebook subset assuming transmission on set S sub-bands (step 1402). For this mode, the codebook subset can be a codebook constructed by taking a Kronecker product of the horizontal codebook subset and the vertical codebook subset. For conditioning on RI, for some embodiments, the reported PMI and CQI values may be calculated conditioned on the reported RI. For other embodiments, the reported PMI and CQI values may be calculated conditioned on rank 1.

The mobile station shall report one sub-band CQI value per codeword for each set S sub-band which is calculated assuming the use of the single precoding matrix in all sub-bands and assuming transmission in the corresponding sub-band; report a wideband CQI value per codeword, which is calculated assuming the use of the single precoding matrix in all sub-bands and transmission on set S sub-bands; and report a horizontal and a vertical precoding matrix indicator corresponding to the selected single precoding matrix (step 1404).

Although FIG. 14 illustrates one example of a method 1400 for providing higher-layer configured sub-band feedback from a mobile station, various changes may be made to FIG. 14. For example, while shown as a series of steps, various steps in FIG. 14 could overlap, occur in parallel, occur in a different order, or occur multiple times.

The following is a description of a design principle for the Rel-10 8-Tx DL MIMO codebook.

For all ranks 1 to 8:
  W1=[X 0;0 X] block diagonal, W=W1*W2
    Block diagonal W1: matching the spatial covariance of dual-polarized antenna setup with any spacing (e.g. 1/2 or 4λ)
    At least sixteen 8TxDFT vectors generated from W1 and co-phasing via W2: matching the spatial covariance of ULA antenna setup Good performance for high and low spatial correlation RANK 1 to 4: X is 4xNb matrix For each W1, adjacent overlapping beams are used to reduce edge effect in frequency-selective precoding (ensure the same W1 is optimal for sub-bands with potentially different W2)

RANK 1 and 2
  32 4TxDFT beams for X (oversampled 8×)
    Beam index: 0, 1, 2, ..., 31
  W1 Nb=4 adjacent overlapping beams
    Sixteen W1 matrices per rank: {0, 1, 2, 3}, {2, 3, 4, 5}, {4, 5, 6, 7}, ..., {28, 29, 30, 31}, {30, 31, 0, 1}
  W2 selection+co-phasing:
    Rank 1: 4 selection hypotheses, 4 QPSK co-phasing hypotheses→16
    Rank 2: 8 selection hypotheses, 2 QPSK co-phasing hypotheses→16

RANK 3 and 4
  16 4TxDFT beams for X (oversampled 4×)
    Beam index: 0, 1, 2, ..., 15
  W1 Nb=8 adjacent overlapping beams
    Four W1 matrices per rank: {0, 1, 2, ..., }, {4, 5, 6, ..., 11}, {8, 9, 10, ..., 15}, {12, ..., 15, 0, ..., 2}
  W2 selection+co-phasing:
    Rank 3: 16 selection hypotheses, 1 QPSK co-phasing hypotheses→16
    Rank 4: 4 selection hypotheses, 2 QPSK co-phasing hypotheses→8

RANK 5 to 8:
  X is the 4×4 4TxDFT matrix (critically sampled)
    Ranks 5 to 7: Four W1 matrices
    Rank 8: One W1 matrix
  W2=[I I;I −I]*[a fixed 8×r column selection matrix]
    Rank 5 to 8: 1 hypothesis per rank
  [I I;I −I] is introduced to ensure equal usage of both polarization groups for each transmission layer
    Good performance for higher rank transmissions (spatial channel with richer scattering)
  Total number of W1 hypotheses across ranks:
  16+16+4+4+4+4+4+1=53

Following is an example of a codebook expression: rank 1 and 2. The proposed codebook can be expressed, for example, as follows:

$$B = [\, b_0 \quad b_1 \quad \ldots \quad b_{31} \,],$$

$$[B]_{1+m,1+n} = e^{j\frac{2\pi mn}{32}},$$

$$m = 0, 1, 2, 3,$$

$$n = 0, 1, \ldots, 31$$

$$X^{(k)} \in$$

$$\{[\, b_{2k \bmod 32} \quad b_{(2k+1) \bmod 32} \quad b_{(2k+2) \bmod 32} \quad b_{(2k+3) \bmod 32} \,] : k = 0, 1, \ldots, 15\}$$

$$W_1^{(k)} = \begin{bmatrix} X^{(k)} & 0 \\ 0 & X^{(k)} \end{bmatrix}$$

Codebook1: $C_1 = \{W_1^{(0)}, W_1^{(1)}, W_1^{(2)}, \ldots, W_1^{(15)}\}$

Below, $\tilde{e}_n$ is a 4×1 selection vector with all zeros except for the n-th element with value 1.

Rank 1:

$$W_2 \in C_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\}$$

$$Y \in \{\tilde{e}_1, \tilde{e}_2, \tilde{e}_3, \tilde{e}_4\}$$

Rank 2:

$$W_2 \in C_2 = \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\}$$

$(Y_1, Y_2) \in$ $\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$ Following is an example of a codebook expression: rank 3 and 4.

$$B = [\, b_0 \quad b_1 \quad \ldots \quad b_{15} \,],$$

$$[B]_{1+m,1+n} = e^{j\frac{2\pi mn}{16}},$$

$$m = 0, 1, 2, 3, n = 0, 1, \ldots 15$$

$$X^{(k)} \in \{[\, b_{4k \bmod 16} \quad b_{(4k+1) \bmod 16} \quad \ldots \quad b_{(4k+7) \bmod 16} \,] : k = 0, 1, 2, 3\}$$

$$W_1^{(k)} = \begin{bmatrix} X^{(k)} & 0 \\ 0 & X^{(k)} \end{bmatrix}$$

Codebook 1: $C_1 = \{W_1^{(0)}, W_1^{(1)}, W_1^{(2)}, W_1^{(3)}\}$

Rank 3:

$$W_2 \in C_2 = \left\{ \frac{1}{\sqrt{2}}\begin{bmatrix} Y_1 & Y_2 \\ Y_1 & -Y_2 \end{bmatrix} \right\}$$

$(Y_1, Y_2) \in$ $$\left\{ \begin{array}{l} (e_1, [\, e_1 \ e_5 \,]), (e_2, [\, e_2 \ e_6 \,]), (e_3, [\, e_3 \ e_7 \,]), (e_4, [\, e_4 \ e_8 \,]), \\ (e_5, [\, e_1 \ e_5 \,]), (e_6, [\, e_2 \ e_6 \,]), (e_7, [\, e_3 \ e_7 \,]), (e_8, [\, e_4 \ e_8 \,]), \\ ([\, e_1 \ e_5 \,], e_5), ([\, e_2 \ e_6 \,], e_6), ([\, e_3 \ e_7 \,], e_7), ([\, e_4 \ e_8 \,], e_8), \\ ([\, e_5 \ e_1 \,], e_1), ([\, e_6 \ e_2 \,], e_2), ([\, e_7 \ e_3 \,], e_3), ([\, e_8 \ e_4 \,], e_4) \end{array} \right\}.$$

Rank 4:

$$W_2 \in C_2 = \left\{ \frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix} \right\}.$$

$Y \in \{[\, e_1 \ e_5 \,], [\, e_2 \ e_6 \,], [\, e_3 \ e_7 \,], [\, e_4 \ e_8 \,]\}$

Following is an example of a codebook expression: ranks 5 through 8.

Rank 5:

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\},$$

$$W_2 = \frac{1}{\sqrt{2}}\begin{bmatrix} \tilde{e}_1 & \tilde{e}_1 & \tilde{e}_2 & \tilde{e}_2 & \tilde{e}_3 \\ \tilde{e}_1 & -\tilde{e}_1 & \tilde{e}_2 & -\tilde{e}_2 & \tilde{e}_3 \end{bmatrix}$$

Rank 6:

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\},$$

$$W_2 = \frac{1}{\sqrt{2}} \begin{bmatrix} \tilde{e}_1 & \tilde{e}_1 & \tilde{e}_2 & \tilde{e}_2 & \tilde{e}_3 & \tilde{e}_3 \\ \tilde{e}_1 & -\tilde{e}_1 & \tilde{e}_2 & -\tilde{e}_2 & \tilde{e}_3 & -\tilde{e}_3 \end{bmatrix}$$

Rank 7:

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\},$$

$$W_2 = \frac{1}{\sqrt{2}} \begin{bmatrix} \tilde{e}_1 & \tilde{e}_1 & \tilde{e}_2 & \tilde{e}_2 & \tilde{e}_3 & \tilde{e}_3 & \tilde{e}_4 \\ \tilde{e}_1 & -\tilde{e}_1 & \tilde{e}_2 & -\tilde{e}_2 & \tilde{e}_3 & -\tilde{e}_3 & \tilde{e}_4 \end{bmatrix}$$

Rank 8:

$$W_1 \in C_1 = \left\{ \begin{bmatrix} X^{(0)} & 0 \\ 0 & X^{(0)} \end{bmatrix}, \right\},$$

$$W_2 = \frac{1}{\sqrt{2}} \begin{bmatrix} \tilde{e}_1 & \tilde{e}_1 & \tilde{e}_2 & \tilde{e}_2 & \tilde{e}_3 & \tilde{e}_3 & \tilde{e}_4 & \tilde{e}_4 \\ \tilde{e}_1 & -\tilde{e}_1 & \tilde{e}_2 & -\tilde{e}_2 & \tilde{e}_3 & -\tilde{e}_3 & \tilde{e}_4 & -\tilde{e}_4 \end{bmatrix}$$

Figure 15A:
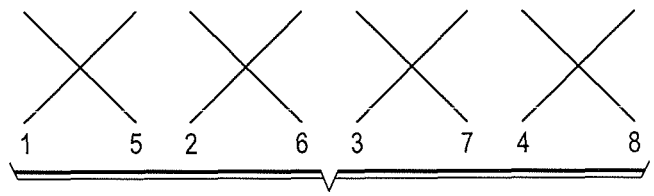
FIG. 15A illustrates cross-polarized dipole array antennas at a transmission node.
Figure 15B:
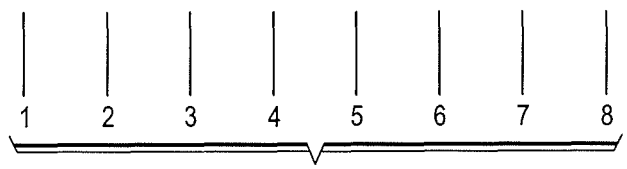
FIG. 15B illustrates uniform linear array antennas at a transmission node.

The Rel-10 8-Tx DL MIMO codebooks are designed mainly for cross-polarized dipole or uniform linear array (ULA) antennas at a transmission node (such as an eNodeB, a base station, or a remote radio head). For example, FIG. 15A illustrates cross-polarized dipole array antennas at a transmission node, and FIG. 15B illustrates uniform linear array antennas at a transmission node. In these illustrations, the numbers 1-8 represent antenna port numbers.

The codebook design principle is as in the following:
Codebook design is targeted towards cross-polarized dipole
Double codebook structure to save feedback overhead
$W = W_1 W_2$
$W_1$ targets wideband/long-term channel properties $$\begin{bmatrix} X & 0 \\ 0 & X \end{bmatrix}$$ where $X$ is a 4 by $N_b$ matrix $W_2$ targets frequency-selective/short-term time channel properties
$W_2$ comprises a combination of column selection and co-phasing operations.

Figure 16:
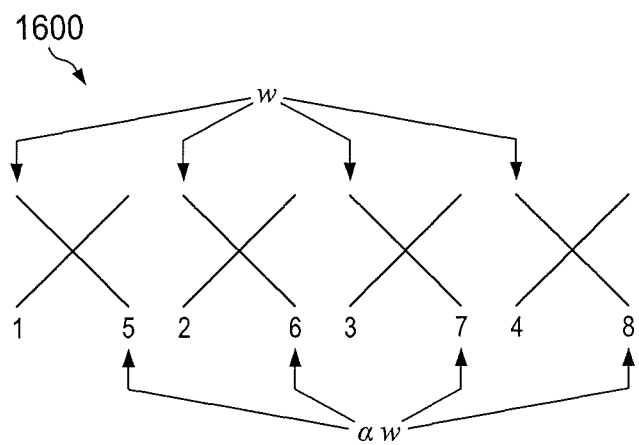
FIG. 16 illustrates a precoder codeword vector according to an embodiment of the disclosure.

FIG. 16 illustrates a precoder codeword vector 1600 according to an embodiment of the disclosure. For this embodiment, the construction of a Rel-10 8-Tx DL MIMO rank-1 precoder codeword vector 1600 is illustrated. The embodiment of the precoder codeword vector 1600 shown in FIG. 16 is for illustration only. Other embodiments of the precoder codeword vector 1600 could be used without departing from the scope of this disclosure.

For the illustrated embodiment, a same w is applied across the two sets of four same-polarization antennas, where w is a selected column from a DFT matrix. Between the two sets, a co-phase [1, α] is applied.

Figure 17A:
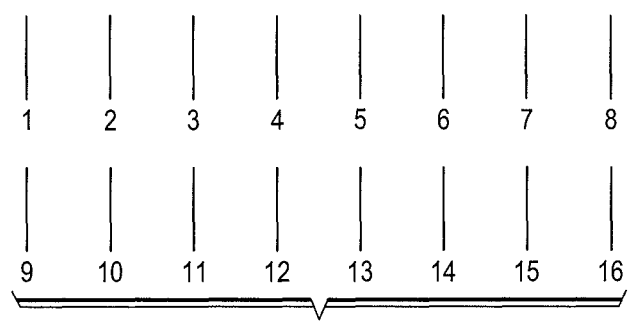
FIG. 17A illustrates two-dimensional (2D) uniform linear array antennas according to an embodiment of the disclosure.

FIG. 17A illustrates two-dimensional (2D) uniform linear array antennas according to an embodiment of the disclosure, and FIG. 17B illustrates 2D cross-polarized array antennas according to an embodiment of the disclosure. The embodiments shown in FIGS. 17A and 17B are for illustration only. Other embodiments of the array antennas could be used without departing from the scope of this disclosure. In these illustrations, the numbers 1-16 represent antenna port numbers.

For the illustrated embodiments, $N_T=16$ antennas placed in a 2D grid, where $N_H=8$ antennas are placed on a horizontal line and $N_V=2$ antennas are placed on a vertical line (note that $N_T=N_H \cdot N_V$). However, it will be understood that the methods and apparatus described in this disclosure may include any suitable numbers for $N_T$, $N_H$ and $N_V$ in order to provide any suitable number of antennas placed in any 2D grid.

The Rel-10 LTE specification captures 2-Tx, 4-Tx and 8-Tx antenna codebooks that are designed mainly targeting horizontally-placed antenna arrays, such as the examples illustrated in FIGS. 15A and 15B.

A mobile station may be configured to receive from the 2D array antennas, such as those illustrated in FIGS. 17A and 17B. Such a mobile station may be configured to receive a CSI-RS configuration from the network (or eNodeB) for facilitating the mobile station's estimates of horizontal and vertical channel state information (CSI), i.e., H-CSI and V-CSI.

In one example, the CSI-RS configuration configures $N_T$ CSI-RS for the $N_T$ antenna ports. In this example, the mobile station is configured to derive the $N_R \times N_T$ channel matrix with estimating channels utilizing the $N_T$ CSI-RS.

In another example, the CSI-RS configuration configures $N_H$ CSI-RS for the $N_H$ antenna ports placed on a horizontal line and $N_V$ CSI-RS for the $N_V$ antenna ports placed on a vertical line. In this example, the mobile station is configured to derive the full $N_R \times N_T$ channel matrix with estimating channels utilizing the $N_H + N_V$ CSI-RS. For example, the mobile station may derive the full channel matrix by applying a Kronecker product of the channel vectors individually obtained with each of $N_H$ and $N_V$ CSI-RS.

It is noted that eNB may explicitly configure in the higher-layer (e.g., RRC) at least one of the total number of elements in the 2D antenna system ($N_T$), the number of the horizontal elements ($N_H$) and the number of the vertical elements ($N_V$). In one example, when the mobile station is configured with $N_H$ and $N_V$, the mobile station may derive that the total number of antenna elements is $N_T = N_H N_V$.

Following is a first CSI codebook design proposal. For the mobile station, a CSI feedback method or a codebook design suitable for feeding back information regarding the full channel matrix may be utilized. In the proposed method, a precoder codeword P that can be used for $N_T$-Tx antenna transmission is constructed by $P = P_1 P_2$.

In some embodiments, $P_1$ is less frequently reported than $P_2$. Thus, a CSI feedback design may take advantage of this, so that $P_1$ captures slow-varying CSI component and $P_2$ captures fast-varying CSI component. In some scenarios, V-CSI varies more slowly than H-CSI (e.g., when the mobile station moves in a radial direction on a circle whose center is its serving eNB). In such scenarios, $P_1$ may capture (or comprise) V-CSI and $P_2$ may capture (or comprise) H-CSI. In some scenarios, H-CSI varies more slowly than V-CSI (e.g., when the mobile station is placed in a tall building and moves up or down in the elevator). In such scenarios, $P_1$ may capture (or comprise) H-CSI and $P_2$ may capture (or comprise) V-CSI.

In case the system targets only one type of scenario, the correspondence (or the association) between {V-CSI, H-CSI} and {$P_1$, $P_2$} can be fixed. In case the system targets both scenarios, the eNB may configure in a higher-layer (e.g., RRC). Therefore, for some embodiments one of the following alternatives may be implemented.

For a first alternative, the correspondence (or the association) between {V-CSI, H-CSI} and {$P_1$, $P_2$} is higher-layer (e.g., RRC) configurable. In other words, whether $P_1$ captures (or comprises) V-CSI and $P_2$ captures (or comprises) H-CSI, or $P_1$ captures H-CSI and $P_2$ captures V-CSI, is higher-layer configurable.

For a second alternative, $P_1$ comprises V-CSI and $P_2$ comprises H-CSI.

For a third alternative, $P_1$ comprises H-CSI and $P_2$ comprises V-CSI.

In some embodiments, $P_1$ may be represented by $$P_1 = \begin{bmatrix} X & 0 \\ 0 & X \end{bmatrix},$$

where the dimension of X is $N_{P1} \times N_B$. Here, X comprises $N_B$ columns of length $N_{P1}$, where each column corresponds to a rank-1 precoder for a first one-dimensional (1D) array. The first 1D array can be either the horizontal or the vertical array of the 2D antenna system. In cases in which $P_1$ comprises H-CSI, the first 1D array is the horizontal array and $N_{P1}=N_H$; on the other hand, in cases in which $P_1$ comprises V-CSI, the first 1D array is the vertical array and $N_{P1}=N_V$. $N_B$ is a positive integer representing a number of candidates out of which $P_2$ would select one.

In some embodiments, $P_1$ is represented by $$P_1 = \begin{bmatrix} X & 0 & \cdots & 0 \\ 0 & X & \ddots & \vdots \\ \vdots & \ddots & \ddots & 0 \\ 0 & \cdots & 0 & X \end{bmatrix},$$

where the dimension of X is $N_{P1} \times N_B$, and the dimension of $P_1$ is at least partly determined by $N_V$ and $N_H$. Here, X comprises $N_B$ columns of length $N_{P1}$, where each column corresponds to a rank-1 precoder for a first 1D array. The first 1D array can be either the horizontal or the vertical array of the 2D antenna system. In cases in which $P_1$ comprises H-CSI, the first 1D array is the horizontal array and $N_{P1}=N_H$; on the other hand, in cases in which $P_1$ comprises V-CSI, the first 1D array is the vertical array and $N_{P1}=N_V$. $N_B$ is a positive integer representing a number of candidates out of which $P_2$ would select one. The dimension of $P_1$ is determined by how many Xs are diagonally repeated; for example, the number of Xs in $P_1$ (denoted by $N_X$) is the same as the number of elements in a second 1D array.

In one method, the mobile station implicitly derives the dimension of X depending on the configured number of a first type of CSI-RS antenna ports and derives the number of repetitions of X depending on a second type of CSI-RS antenna ports.

In one example, the first type is H-CSI-RS and the second type is V-CSI-RS, in which case:

(the dimension of $X$)=$N_H \times N_B$, and (the number of repetitions of $X$)=$N_V$, where $N_H$ and $N_V$ are the numbers of the V-CSI-RS and the H-CSI-RS antenna ports, respectively. In this case, the first one-dimensional array may comprise $N_H$ elements, and the second one-dimensional array may comprise $N_V$ elements.

Similarly, the dimension of X and the number of repetitions of X in the opposite case of where the first type is V-CSI-RS and the second type is H-CSI-RS can be determined as:

(the dimension of $X$)=$N_V \times N_B$ and;

(the number of repetitions of $X$)=$N_H$

In another method, the mobile station may be configured to receive at least one explicit higher-layer parameter indicating the dimension of X and the number of repetitions of X.

In some embodiments, $P_2$ is composed of a combination of column selection and co-phasing operations. The column selection component would select one rank-1 precoding vector for the first 1D array antenna out of the number of candidates. The co-phasing component determines a precoder for a second 1D array antenna. The second 1D array antenna would be H-CSI if $P_1$ comprises V-CSI and would be V-CSI if $P_1$ comprises H-CSI.

FIG. 18 illustrates an example of the construction of a precoder codeword P 1800 for a 2D array antenna system according to an embodiment of the disclosure. The embodiment of the precoder codeword 1800 shown in FIG. 18 is for illustration only. Other embodiments of the precoder codeword 1800 could be used without departing from the scope of this disclosure.

For the illustrated embodiment, a 2D antenna system comprises $N_H$=8 horizontal components and $N_V$=2 vertical components. In the example, $P_1$ comprises H-CSI, and X comprises $N_B$=4 columns of length $N_{P1}=N_H$=8. The column selector of $P_2$, i.e., $e_1$=[1 0 0 0], selects the first column of X, and the co-phasing component determines a precoder for the vertical dimension (or V-CSI), i.e., [$c_1$, $c_2$]=[+1 $\alpha$].

The construction of X can be done in a rank-dependent way. For example, when rank is 1 or 2, some alternatives of constructing X are described below.

For a first alternative, each column of X is selected from a DFT codebook comprising DFT vectors of length $N_{DFT}$. Codewords of the DFT codebook are columns of B, where B is defined as:

$$B = [\, b_0 \quad b_1 \quad \ldots \quad b_{N_{DFT}-1}\,],$$

$$[B]_{1+m,1+n} = e^{j\frac{2\pi mn}{N_{DFT}}},$$

$$m = 0, 1, 2, 3, n = 0, 1, \ldots, N_{DFT} - 1.$$

Here, the value of $N_{DFT}$ is determined by a function of $N_{P1}$, i.e., $N_{DFT}=f(N_{P1})$. In one example, $f(N_{P1})=N_{P1}N_{oversample}$, where $N_{oversample}$ is a positive integer determining oversampling rate, and examples of values would be 1, 2, 4, etc.

For a second alternative, each column of X is selected from a rank-1 codebook, where the rank-1 codebook is selected from among a set of codebooks and the selection depends on $N_{P1}$. In one example, each column of X is selected from a DFT codebook comprising a rank-1 vector from an LTE codebook selected out of the 2-Tx, the 4-Tx, the 8-Tx LTE codebooks, according to the number of rows in $P_1$ matrix, i.e., $N_{P1}$.

In other words, in cases in which $N_{P1}$=8, the selected LTE codebook may be the Rel-10 8-Tx rank-1 codebook, which comprises column vectors constructed by W=$W_1 W_2$. In cases in which $N_{P1}$=4, the selected LTE codebook may be the Rel-8 4-Tx rank-1 codebook. In cases in which $N_{P1}$=2, the selected LTE codebook may be the Rel-8 2-Tx rank-1 codebook.

In another example, in cases in which $N_{P1}$=8, the selected codebook may be the length-$N_{DFT}$ DFT codebook, where $N_{DFT}$ and the DFT codebook are derived as described with reference to the first alternative, above. In cases in which $N_{P1}=4$, the selected codebook may be the Rel-8 4-Tx rank-1 codebook. In cases in which $N_{P1}=2$, the selected codebook may be the Rel-8 2-Tx rank-1 codebook.

For a third alternative, each column of X is selected from a rank-1 codebook, where the rank-1 codebook is selected among a set of codebooks and the selection depends on $N_{P1}$ and a parameter configured in the higher-layer (e.g., RRC). In one example, in cases in which $N_{P1}=8$ and the parameter indicates a DFT codebook should be utilized, the selected codebook may be a DFT codebook, e.g., the length-$N_{DFT}$ DFT codebook, where $N_{DFT}$ and the DFT codebook are derived as described with reference to the first alternative, above. On the other hand, in cases in which $N_{P1}=8$ and the parameter indicates the Rel-10 8-Tx rank-1 codebook should be utilized, then the selected codebook may be the Rel-10 8-Tx rank-1 codebook, which comprises column vectors constructed by $W=W_1 W_2$. In cases in which $N_{P1}=4$, the selected LTE codebook may be the Rel-8 4-Tx rank-1 codebook. In cases in which $N_{P1}=2$, the selected LTE codebook may be the Rel-8 2-Tx rank-1 codebook.

In some embodiments, two separately distinguishable sets of CSI-RS may be provided for the estimation of $P_1$ and $P_2$. For example, a first set of CSI-RS is provided for estimating $P_1$ and for the column selection component of $P_2$; and a second set of CSI-RS is provided for estimating the co-phase component of $P_2$. Furthermore, the first set and the second set of CSI-RS are higher-layer (or RRC) configured. In one example, the RRC layer defines two separate RRC-configured information elements for the two sets of CSI-RS, i.e., CSIRS-Config1 and CSIRS-Config2. Then, CSI-RS configured by CSIRS-Config1 may be used for estimating $P_1$ and the column selection component of $P_2$; and the CSI-RS configured by CSIRS-Config2 may be used for estimating the co-phase component of $P_2$.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile station configured to receive transmissions from a two-dimensional array of antennas at a base station, wherein the array comprises a plurality of groups of antennas, the mobile station comprising a main processor, the main processor configured:
   to receive from the base station a first configuration for a first set of reference signals and a second configuration for a second set of reference signals;
   to estimate a first channel state with the first set of reference signals and a second channel state with the second set of reference signals;
   to determine a co-phasing scalar component for each of the groups of antennas based on the first channel state;
   to generate a matrix X comprising a plurality of column vectors selected from a codebook based on the second channel state, wherein each of the column vectors quantizes channel coefficients for one of the groups of antennas;
   to generate a matrix $P_1$, wherein the matrix $P_1$ comprises a block diagonal matrix having the matrix X for each block diagonal element;
   to generate a matrix $P_2$ comprising a plurality of vector elements, wherein each vector element comprises one of the co-phasing scalar components and a column selector vector configured to select a column of the matrix X;
   to transmit to the base station a first precoding matrix information corresponding to the matrix $P_1$ and a second precoding matrix information corresponding to the matrix $P_2$; and
   to transmit to the base station a channel quality information (CQI), wherein the CQI is derived with a precoding matrix P defined by $P=P_1 P_2$.

2. The mobile station of claim 1, wherein each group of antennas comprises antennas placed substantially on a horizontal line of the two-dimensional array of antennas.

3. The mobile station of claim 1, wherein each group of antennas comprises antennas placed substantially on a vertical line of the two-dimensional array of antennas.

4. The mobile station of claim 1, wherein the first set of reference signals is received from antennas in one of the groups of antennas, and wherein the second set of reference signals is received from a set of antennas comprising one antenna selected from each group of antennas.

5. The mobile station of claim 1, wherein each column vector of X is selected from a Discrete Fourier Transform (DFT) codebook comprising DFT vectors of length being equal to a number of antennas in each of the groups of antennas, denoted by $N_{P1}$.

6. The mobile station of claim 5, wherein the DFT codebook comprises a plurality of codewords, wherein each codeword is defined by a corresponding column of B, and wherein B is defined as:

$$B = [\, b_0 \quad b_1 \quad \ldots \quad b_{N_{DFT}-1}\,],$$

$$[B]_{1+m,1+n} = e^{j\frac{2\pi mn}{N_{DFT}}},$$

$$m = 0, 1, 2 \ldots, N_{P1}, n = 0, 1, \ldots, N_{DFT}-1,$$

wherein $N_{DFT}$ is an integer multiple of $N_{P1}$.

7. A method for constructing a channel state information (CSI) codeword at a mobile station in a wireless communication system comprising a base station having a two-dimensional array of antennas, wherein the array comprises a plurality of groups of antennas, the method comprising:
   receiving from the base station a first configuration for a first set of reference signals and a second configuration for a second set of reference signals;
   estimating a first channel state with the first set of reference signals and a second channel state with the second set of reference signals;
   determining a co-phasing scalar component for each of the groups of antennas based on the first channel state;
   generating a matrix X comprising a plurality of column vectors selected from a codebook based on the second channel state, wherein each of the column vectors quantizes channel coefficients for one of the groups of antennas;

generating a matrix $P_1$, wherein the matrix $P_1$ comprises a block diagonal matrix having the matrix X for each block diagonal element;

generating a matrix $P_2$ comprising a plurality of vector elements, wherein each vector element comprises one of the co-phasing scalar components and a column selector vector configured to select a column of the matrix X;

transmitting to the base station a first precoding matrix information corresponding to the matrix $P_1$ and a second precoding matrix information corresponding to the matrix $P_2$; and transmitting to the base station a channel quality information (CQI), wherein the CQI is derived with a precoding matrix P defined by $P=P_1P_2$.

8. The method of claim 7, wherein each group of antennas comprises antennas placed substantially on a horizontal line of the two-dimensional array of antennas.

9. The method of claim 7, wherein each group of antennas comprises antennas placed substantially on a vertical line of the two-dimensional array of antennas.

10. The method of claim 7, wherein the first set of reference signals is received from antennas in one of the groups of antennas, and wherein the second set of reference signals is received from a set of antennas comprising one antenna selected from each group of antennas.

11. The method of claim 7, wherein each column vector of X is selected from a Discrete Fourier Transform (DFT) codebook comprising DFT vectors of length being equal to a number of antennas in each of the groups of antennas, denoted by $N_{P1}$.

12. The method of claim 11, wherein the DFT codebook comprises a plurality of codewords, wherein each codeword is defined by a corresponding column of B, and wherein B is defined as:

$$B = [\, b_0 \quad b_1 \quad \ldots \quad b_{N_{DFT}-1} \,],$$
$$[B]_{1+m,1+n} = e^{j\frac{2\pi mn}{N_{DFT}}},$$
$$m = 0, 1, 2 \ldots , N_{P1}, n = 0, 1, \ldots , N_{DFT} - 1,$$

wherein $N_{DFT}$ is an integer multiple of $N_{P1}$.

13. A base station in a wireless communication system, comprising:

a two-dimensional array of antennas, wherein the array comprises a plurality of groups of antennas; and a base transceiver subsystem (BTS) controller configured:

to transmit to a mobile station a first configuration for a first set of reference signals and a second configuration for a second set of reference signals;

to receive from the mobile station a first precoding matrix information corresponding to a matrix $P_1$ and a second precoding matrix information corresponding to a matrix $P_2$, wherein a first channel state is estimated with the first set of reference signals and a second channel state is estimated with the second set of reference signals, wherein a co-phasing scalar component is determined for each of the groups of antennas based on the first channel state, wherein the matrix $P_1$ comprises a block diagonal matrix having a matrix X for each block diagonal element, wherein the matrix $P_2$ comprises a plurality of vector elements, wherein each vector element comprises one of the co-phasing scalar components and a column selector vector configured to select a column of the matrix X, and wherein the matrix X comprises a plurality of column vectors selected from a codebook based on the second channel state, wherein each of the column vectors quantizes channel coefficients for one of the groups of antennas; and to receive from the mobile station a channel quality information (CQI), wherein the CQI is derived with a precoding matrix P defined by $P=P_1P_2$.

14. The base station of claim 13, wherein each group of antennas comprises antennas placed substantially on a horizontal line of the two-dimensional array of antennas.

15. The base station of claim 13, wherein each group of antennas comprises antennas placed substantially on a vertical line of the two-dimensional array of antennas.

16. The base station of claim 13, wherein the first set of reference signals is transmitted from antennas in one of the groups of antennas, and wherein the second set of reference signals is transmitted from a set of antennas comprising one antenna selected from each group of antennas.

17. The base station of claim 13, wherein each column vector of X is selected from a Discrete Fourier Transform (DFT) codebook comprising DFT vectors of length being equal to a number of antennas in each of the groups of antennas, denoted by $N_{P1}$.

18. The base station of claim 17, wherein the DFT codebook comprises a plurality of codewords, wherein each codeword is defined by a corresponding column of B, and wherein B is defined as:

$$B = [\, b_0 \quad b_1 \quad \ldots \quad b_{N_{DFT}-1} \,],$$
$$[B]_{1+m,1+n} = e^{j\frac{2\pi mn}{N_{DFT}}},$$
$$m = 0, 1, 2 \ldots , N_{P1}, n = 0, 1, \ldots , N_{DFT} - 1,$$

wherein $N_{DFT}$ is an integer multiple of $N_{P1}$.

* * * * *